(12) United States Patent
Zhamu et al.

(10) Patent No.: US 10,361,460 B2
(45) Date of Patent: Jul. 23, 2019

(54) PROCESS FOR PRODUCING LITHIUM BATTERIES HAVING AN ULTRA-HIGH ENERGY DENSITY

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 681 days.

(21) Appl. No.: 14/756,698

(22) Filed: Oct. 2, 2015

(65) Prior Publication Data

US 2017/0098856 A1 Apr. 6, 2017

(51) Int. Cl.
*H01M 10/05* (2010.01)
*H01M 10/058* (2010.01)
(Continued)

(52) U.S. Cl.
CPC ........... *H01M 10/058* (2013.01); *H01M 4/13* (2013.01); *H01M 4/131* (2013.01); *H01M 4/133* (2013.01); *H01M 4/136* (2013.01); *H01M 4/483* (2013.01); *H01M 4/523* (2013.01); *H01M 4/525* (2013.01); *H01M 4/583* (2013.01); *H01M 4/5825* (2013.01); *H01M 4/60* (2013.01); *H01M 4/606* (2013.01); *H01M 4/663* (2013.01); *H01M 4/808* (2013.01); *H01M 6/02* (2013.01); *H01M 6/14* (2013.01); *H01M 10/0525* (2013.01);
(Continued)

(58) Field of Classification Search
None
See application file for complete search history.

(56) References Cited

U.S. PATENT DOCUMENTS 9,692,056 B1 * 6/2017 Liu .......................... H01M 4/64
2005/0048371 A1 * 3/2005 Nagayama ................ C25F 3/02
429/236

(Continued)

OTHER PUBLICATIONS

Chen, Z. et al. "Three-dimensional flexible and conductive interconnected graphene networks grown by chemical vapor deposition," Nat. Mater. 10, 424-428 (2011).
(Continued)

*Primary Examiner* — Ula C Ruddock
*Assistant Examiner* — Tony S Chuo

(57) ABSTRACT

A process for producing a lithium battery, comprising: (A) Preparing a plurality of conductive porous layers, wet anode layers, and wet cathode layers; (B) Stacking a desired number of porous layers and wet anode layers in an alternating manner to form an anode electrode having a thickness no less than 100 μm; (C) Placing a porous separator layer in contact with the anode electrode; (D) Stacking a desired number of porous layers wet cathode layers in an alternating manner to form a cathode electrode in contact with the porous separator, wherein the cathode electrode has a thickness no less than 100 μm; and (F) Assembling and sealing the anode electrode, separator, and cathode electrode in a housing to produce the lithium battery. The consolidated anode or cathode layer is preferably thicker than 300 μm, more preferably thicker than 400 μm, and further more preferably greater than 500 μm.

14 Claims, 15 Drawing Sheets

(51) Int. Cl.
| | |
|---|---|
| *H01M 4/131* | (2010.01) |
| *H01M 4/133* | (2010.01) |
| *H01M 4/136* | (2010.01) |
| *H01M 4/48* | (2010.01) |
| *H01M 4/52* | (2010.01) |
| *H01M 4/525* | (2010.01) |
| *H01M 4/58* | (2010.01) |
| *H01M 4/583* | (2010.01) |
| *H01M 4/60* | (2006.01) |
| *H01M 4/66* | (2006.01) |
| *H01M 4/80* | (2006.01) |
| *H01M 6/02* | (2006.01) |
| *H01M 6/14* | (2006.01) |
| *H01M 10/0525* | (2010.01) |
| *H01M 4/13* | (2010.01) |
| *H01M 10/0585* | (2010.01) |
| *H01M 4/38* | (2006.01) |
| *H01M 4/50* | (2010.01) |
| *H01M 4/587* | (2010.01) |

(52) U.S. Cl.
CPC ........ *H01M 10/0585* (2013.01); *H01M 4/386* (2013.01); *H01M 4/502* (2013.01); *H01M 4/587* (2013.01)

(56) References Cited

U.S. PATENT DOCUMENTS

2014/0011083 A1* 1/2014 Asako .................. H01M 4/624
 429/211
2014/0363746 A1* 12/2014 He ...................... H01M 10/052
 429/406

OTHER PUBLICATIONS

PCT/US16/52255 International Search Report and Written Opinion dated Jun. 8, 2017, 8 pages.
Chen et al., "Three-dimensional Flexible and Conductive Interconnected Graphene Networks Grown by Chemical Vapor Deposition" Nature Materials (2011) vol. 10, pp. 424-428.

* cited by examiner scale = 500 nm

Metal grid; scale = 200 μm

Carbon nano-fiber mat; fiber diameter = 150 nm

Graphene foam: ──── 100 μm

Carbon foam

Graphite foam

Ni foam

Cu foam

Stainless steel foam

PROCESS FOR PRODUCING LITHIUM BATTERIES HAVING AN ULTRA-HIGH ENERGY DENSITY

FIELD OF THE INVENTION

The present invention relates generally to the field of lithium batteries, including primary and secondary (rechargeable) lithium metal batteries and lithium-ion batteries.

BACKGROUND OF THE INVENTION

Historically, today's most favorite rechargeable energy storage devices—lithium-ion batteries—actually evolved from rechargeable "lithium metal batteries" using lithium (Li) metal or Li alloy as the anode and a Li intercalation compound as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications. During the mid-1980s, several prototypes of rechargeable Li metal batteries were developed. A notable example was a battery composed of a Li metal anode and a molybdenum sulfide cathode, developed by MOLI Energy, Inc. (Canada). This and several other batteries from different manufacturers were abandoned due to a series of safety problems caused by sharply uneven Li growth (formation of Li dendrites) as the metal was re-plated during each subsequent recharge cycle. As the number of cycles increases, these dendritic or tree-like Li structures could eventually traverse the separator to reach the cathode, causing internal short-circuiting.

To overcome these safety issues, several alternative approaches were proposed in which either the electrolyte or the anode was modified. One approach involved replacing Li metal by graphite (another Li insertion material) as the anode. The operation of such a battery involves shuttling Li ions between two Li insertion compounds, hence the name "Li-ion battery." Presumably because of the presence of Li in its ionic rather than metallic state, Li-ion batteries are inherently safer than Li-metal batteries.

Lithium ion battery is a prime candidate energy storage device for electric vehicle (EV), renewable energy storage, and smart grid applications. The past two decades have witnessed a continuous improvement in Li-ion batteries in terms of energy density, rate capability, and safety, and somehow the significantly higher energy density Li metal batteries have been largely overlooked. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density <<1 kW/kg), and necessity to use pre-lithiated cathodes (e.g. lithium cobalt oxide), thereby limiting the choice of available cathode materials. Further, these commonly used cathodes have a relatively low specific capacity (typically <200 mAh/g). These factors have contributed to the two major shortcomings of today's Li-ion batteries—low gravimetric and volumetric energy densities (typically 150-220 Wh/kg and 450-600 Wh/L) and low power densities (typically <0.5 kW/kg and <1.0 kW/L), all based on the total battery cell weight or volume.

The emerging EV and renewable energy industries demand the availability of rechargeable batteries with a significantly higher gravimetric energy density (e.g. demanding >>250 Wh/kg and, preferably, >>300 Wh/kg) and higher power density (shorter recharge times) than what the current Li ion battery technology can provide. Furthermore, the microelectronics industry is in need of a battery having a significantly larger volumetric energy density (>650 Wh/L, preferably >750 Wh/L) since consumers demand to have smaller-volume and more compact portable devices (e.g. smart phones and tablets) that store more energy. These requirements have triggered considerable research efforts on the development of electrode materials with a higher specific capacity, excellent rate capability, and good cycle stability for lithium ion batteries.

Several elements from Group III, IV, and V in the periodic table can form alloys with Li at certain desired voltages. Therefore, various anode materials based on such elements and some metal oxides have been proposed for lithium ion batteries. Among these, silicon has been recognized as one of the next-generation anode materials for high-energy lithium ion batteries since it has a nearly 10 times higher theoretical gravimetric capacity than graphite 3,590 mAh/g based on $Li_{3.75}Si$ vs. 372 mAh/g for $LiC_6$) and ~3 times larger volumetric capacities. However, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsic low electric conductivity of silicon is another challenge that needs to be addressed.

Although several high-capacity anode active materials have been found (e.g., Si), there has been no corresponding high-capacity cathode material available. Current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.

(2) The insertion and extraction of lithium in and out of these commonly used cathodes rely upon extremely slow solid-state diffusion of Li in solid particles having very low diffusion coefficients (typically $10^{-8}$ to $10^{-14}$ cm$^2$/s), leading to a very low power density (another long-standing problem of today's lithium-ion batteries).

(3) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.

Low-capacity anode or cathode active materials are not the only problem that the lithium-ion battery industry faces. There are serious design and manufacturing issues that the lithium-ion battery industry does not seem to be aware of, or has largely ignored. For instance, despite the high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 mg/cm$^2$ and mostly <8 mg/cm$^2$ (areal density=the amount of active materials per electrode cross-sectional area along the electrode thickness direction). The cathode active material amount is typically 1.5-2.5 times higher than the anode active material. As a result, the weight proportion of the anode active material (e.g. graphite or carbon) in a lithium-ion battery is typically from 12% to 17%, and that of the cathode active material (e.g. $LiMn_2O_4$) from 17% to 35% (mostly <30%). The weight fraction of the cathode and anode active materials combined is typically from 30% to 45% of the cell weight The low active material mass loading is primarily due to the inability to obtain thicker electrodes (thicker than 100-200 µm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. The low areal densities and low volume densities (related to thin electrodes and poor packing density) result in a relatively low volumetric capacity and low volumetric energy density of the battery cells.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities.

Therefore, there is clear and urgent need for lithium batteries that have high active material mass loading (high areal density), active materials with high apparent density (high tap density), high electrode thickness without significantly decreasing the electron and ion transport rates (e.g. without a long electron transport distance or lithium ion diffusion path), high volumetric capacity, and high volumetric energy density.

SUMMARY OF THE INVENTION

The present invention provides a process for producing a lithium battery having a high active material mass loading, exceptionally low overhead weight and volume (relative to the active material mass and volume), high volumetric capacity, and unprecedentedly high volumetric energy density and power density. This lithium battery can be a primary battery (non-rechargeable) or a secondary battery (rechargeable), including a rechargeable lithium metal battery (having a lithium metal anode) and a lithium-ion battery (e.g. having a first lithium intercalation compound as an anode active material and a second lithium intercalation or absorbing compound, having a much higher electrochemical potential than the first one, as a cathode active material). The electrochemical potential of the cathode active material is higher than that of the anode active material by at least 1.0 volt, preferably at least 1.5 volts, further preferably at least 2.0 volts, more preferably at least 3.0 volts, even more preferably at least 3.5 volts, and most preferably at least 4.0 volts.

In one preferred embodiment, the invented process comprises:

(A) Preparing a plurality of electrically conductive porous layers, a plurality of wet anode layers of an anode active material and an optional conductive additive mixed with a first liquid electrolyte, and a plurality of wet cathode layers of a cathode active material and an optional conductive additive mixed with a second liquid electrolyte, wherein the conductive porous layers contain interconnected conductive pathways and at least 80%, by volume of pores;

(B) Stacking and consolidating a desired number of porous layers and a desired number of wet anode layers in an alternating manner to form an anode electrode having a thickness no less than 100 µm (preferably >200 µm, further preferably >300 µm, more preferably >400 µm; further more preferably >500 µm, 600 µm, or even >1,000 µm; no theoretical limitation on this anode thickness). Consolidation may involve the application of a compressive stress to force the wet anode layer ingredients to infiltrate into the pores of the multiple conductive porous layers. These multiple conductive porous layers are also compressed together to form an anode current collector that essentially extends over the entire anode electrode thickness;

(C) Placing a porous separator layer in contact with the anode electrode;

(D) Stacking and consolidating a desired number of porous layers and a desired number of wet cathode layers in an alternating manner to form a cathode electrode in contact with the porous separator, wherein the resulting cathode electrode has a thickness no less than 100 µm; wherein step (D) is conducted before or after step (B); The consolidated cathode thickness is preferably >200 µm, further preferably >300 µm, more preferably >400 µm; further more preferably >500 µm, 600 µm, or even >1,000 µm; no theoretical limitation on this cathode thickness. Consolidation may involve the application of a compressive stress to force the wet cathode layer ingredients to infiltrate into the pores of the multiple conductive porous layers. These multiple conductive porous layers are also compressed together to form a cathode current collector that essentially extends over the entire cathode electrode thickness; and (E) Assembling and sealing the anode electrode, porous separator, and cathode electrode in a housing to produce the lithium battery;

In this battery, the anode active material has a typical material mass loading no less than 20 mg/cm$^2$ in the anode electrode and/or the cathode active material has a material mass loading no less than 15 mg/cm$^2$ for an organic or polymer material or no less than 30 mg/cm$^2$ for an inorganic and non-polymer material in the cathode electrode.

Each of the plurality of wet anode layers contains an anode active material and an optional conductive additive (e.g. carbon particles and isolated graphene sheets) mixed with a first liquid electrolyte. Although not desirable, a binder resin can be added into the wet anode layers or wet cathode layers. The liquid electrolyte typically contains a lithium salt dissolved in a liquid solvent (e.g. water, aprotic organic solvent, ionic liquid or a mixture of an organic solvent and ionic liquid) having a concentration typically >1 M, more typically >2 M, further more typically >3.5 M, or even >5 M. This high concentration of lithium salt, in conjunction with the anode active materials (e.g. nano particles of Si, Sn, $SnO_2$, or carbon/graphite micron particles) and the optional conductive additive combined, make the wet anode layer exhibit a consistency, viscosity, or rigidity sufficient to enable handling by human hands or robotic arms without dripping. Typically, the viscosity range is from $10^1$ mPa-sec to $10^6$ mPa-sec, preferably $10^2$ mPa-sec to $10^5$ mPa-sec, and more preferably from $10^3$ mPa-sec to $10^5$ mPa-sec. The wet cathode layers preferably have comparable properties as the wet anode layers for easy handling and subsequent consolidation.

There is no restriction on the types of anode active materials or cathode active materials that can be used in practicing the instant invention. However, preferably, the anode active material absorbs lithium ions at an electrochemical potential of less than 1.0 volt (preferably less than 0.7 volts) above the $Li/Li^+$ (i.e. relative to $Li \rightarrow Li^+ + e^-$ as the standard potential) when the battery is charged. In one preferred embodiment, the anode active material is selected from the group consisting of (a) Particles of natural graphite, artificial graphite, meso-carbon microbeads (MCMB), and carbon (including soft carbon, hard carbon, carbon nanofiber, and carbon nano-tube); (b) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (c) Alloys or intermetallic compounds of Si, Ge, Sn, Pb, Sb, Bi, Zn, Al, or Cd with other elements, wherein said alloys or compounds are stoichiometric or non-stoichiometric; (d) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites; (e) Pre-lithiated versions thereof; (f) Pre-lithiated graphene sheets; and combinations thereof.

In some preferred embodiments, the cathode active material contains a lithium intercalation compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, and combinations thereof.

There is no theoretical limitation on the thickness of individual electrically conductive porous layers prior to consolidation. They may each have a thickness from 1 µm to 600 µm, preferably from 10 µm to 300 µm, further preferably from 50 µm to 200 µm. These desired thickness ranges facilitate the infiltration of the wet anode layer (liquid electrolyte, anode active material, and optional conductive additive) or wet cathode layer (liquid electrolyte, cathode active material, and optional conductive additive) during the consolidation step. These thickness ranges (being not too thin) also would not require stacking too many layers of porous conductive layers and wet anode (or cathode) layers to make an electrode. The electrically conductive porous layers may be selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerox gel, graphene foam, graphene oxide foam, reduced graphene oxide foam, carbon fiber foam, graphite fiber foam, exfoliated graphite foam, or a combination thereof. These multiple electrically conductive porous layers, when consolidated (compressed) together, make a good current collector at the anode or the cathode. No separate or additional current collector is required or needed.

The pore volume (e.g. >80%) of the electrically conductive porous layers is a critically important requirement to ensure a large proportion of active materials accommodated in the current collector. Based on this criterion, conventional paper or textiles made of natural and/or synthetic fibers do not meet this requirement since they do not have a sufficient amount of properly sized pores (e.g. the anode active materials or cathode active materials could not infiltrate into the pores of these paper or textile structures).

The pore sizes in the electrically conductive porous layers are preferably in the range from 10 nm to 100 µm, more preferably from 100 nm to 50 µm, further preferably from 500 nm to 20 µm, and even more preferably from 1 µm to 10 µm, and most preferably from 1 µm to 5 µm. These pore size ranges are designed to accommodate anode active materials (such as graphite micron particles or Si nano particles) and cathode active materials (such as lithium cobalt oxide or lithium iron phosphate), having a primary or secondary particle size typically from 10 nm to 20 µm in diameter, and most typically from 50 nm to 10 µm, further typically from 100 nm to 5 µm, and most typically from 200 nm to 3 µm.

More significantly, however, since all active material particles in a pore (e.g. with pore size of 5 µm) are, on average, within a distance of 2.5 µm from a pore wall (conducting pathway) in the electrically conductive porous layers structure, electrons can be readily collected from the anode active material particle and lithium ions do not have to undergo a long-distance solid-state diffusion. This is in contrast to the notion that some electrons in the conventional thick electrode of prior art lithium-ion battery (e.g. wherein graphite particle layer >100 µm in thickness is coated onto a surface of a solid Cu foil current collector 10 µm thick) must travel at least 50 µm to get collected by a current collector (meaning a larger internal resistance and reduced ability to deliver a higher power).

In general, the first liquid electrolyte and the second liquid electrolyte are identical in a battery, but they can be different in composition. The liquid electrolytes can be an aqueous liquid, organic liquid, ionic liquid (ionic salt having a melting temperature lower than 100° C., preferably lower than room temperature, 25° C.), or a mixture of an ionic liquid and an organic liquid at a ratio from 1/100 to 100/1. The organic liquid is desirable, but the ionic liquid is preferred. A gel electrolyte can also be used provided the electrolyte has some mobility to enable infiltration of wet anode or cathode materials.

In a preferred embodiment, the consolidated anode and/or cathode electrodes have a thickness no less than 200 µm; the electrically conductive porous layers have at least 85% by volume of pores; the anode active material has a mass loading no less than 25 mg/cm$^2$ and/or occupies at least 25% by weight or by volume of the entire battery cell; the cathode active material has a mass loading no less than 20 mg/cm$^2$ for an organic or polymer material or no less than 40 mg/cm$^2$ for an inorganic and non-polymer material in the cathode and/or occupies at least 40% by weight or by volume of the entire battery cell.

In another preferred embodiment, the consolidated anode and/or cathode electrodes have a thickness no less than 300 µm; the electrically conductive porous layers have at least 90% by volume of pores; the anode active material has a mass loading no less than 30 mg/cm$^2$ and/or occupies at least 30% by weight or by volume of the entire battery cell, and/or the cathode active material has a mass loading no less than 25 mg/cm² for an organic or polymer material or no less than 50 mg/cm² for an inorganic and non-polymer material in said cathode and/or occupies at least 50% by weight or by volume of the entire battery cell.

More preferably, the consolidated anode and/or cathode electrodes have a thickness no less than 400 μm (more preferably greater than 500 μm); the electrically conductive porous layers have at least 95% by volume of pores, and/or said anode active material has a mass loading no less than 35 mg/cm² and/or occupies at least 35% by weight or by volume of the entire battery cell, and/or the cathode active material has a mass loading no less than 30 mg/cm² for an organic or polymer material or no less than 55 mg/cm² for an inorganic and non-polymer material in the cathode and/or occupies at least 55% by weight or by volume of the entire battery cell.

The aforementioned requirements on electrode thickness, porosity levels, the anode active material areal mass loading or mass fraction relative to the entire battery cell, or the cathode active material areal mass loading or mass fraction relative to the entire battery cell have not been possible with conventional lithium batteries using the conventional process of slurry coating and drying.

In some embodiments, the anode active material is a pre-lithiated version of graphene sheets selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof. Surprisingly, without pre-lithiation, the resulting lithium battery cell does not exhibit a satisfactory cycle life (i.e. capacity decays rapidly).

Preferably, the volume ratio of the anode active material-to-liquid electrolyte in the first dispersion is from 1/5 to 20/1 (preferably from 1/3 to 5/1) and/or the volume ratio of cathode active material-to-the liquid electrolyte in the second dispersion is from 1/5 to 20/1 (preferably from 1/3 to 5/1).

Another embodiment of the present invention is a process for producing a lithium battery (e.g. a lithium metal secondary battery). The process comprises: (A) Preparing a plurality of electrically conductive porous layers, and a plurality of wet cathode layers of a cathode active material and an optional conductive additive mixed with a liquid electrolyte, wherein said conductive porous layers contain interconnected conductive pathways and at least 80% by volume of pores; (B) Preparing an anode electrode having an anode current collector that has two opposed primary surfaces wherein at least one of the two primary surfaces is deposited with a layer of lithium metal or lithium alloy having at least 50% by weight of lithium element in the alloy; (C) Placing a porous separator layer in contact with the anode electrode; (D) Stacking and consolidating a desired number of conductive porous layers and a desired number of wet cathode layers in an alternating manner to form a cathode electrode in contact with the porous separator, wherein the cathode electrode has a thickness no less than 100 μm; wherein step (D) is conducted before or after step (B); and (E) Assembling and sealing the anode electrode, porous separator, and cathode electrode in a housing to produce the lithium battery; wherein the cathode active material has a material mass loading no less than 15 mg/cm² for an organic or polymer material or no less than 30 mg/cm² for an inorganic and non-polymer material in the cathode electrode.

In some embodiments, the cathode active material in this lithium metal battery contains a lithium intercalation compound or lithium-absorbing compound selected from an inorganic material, an organic or polymeric material, a metal oxide/phosphate/sulfide, or a combination thereof. For example, the metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, transition metal sulfide, or a combination thereof. The inorganic material is selected from sulfur, sulfur compound, lithium polysulfide, transition metal dichalcogenide, a transition metal trichalcogenide, or a combination thereof. In particular, the inorganic material is selected from $TiS_2$, $TaS_2$, $MoS_2$, $NbSe_3$, $MnO_2$, $CoO_2$, an iron oxide, a vanadium oxide, or a combination thereof. These will be further discussed later.

In this lithium metal battery, the cathode active material contains a lithium intercalation compound selected from a metal carbide, metal nitride, metal boride, metal dichalcogenide, or a combination thereof. In some embodiments, the cathode active material contains a lithium intercalation compound selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. Preferably, the cathode active material contains a lithium intercalation compound selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein said discs, platelets, or sheets have a thickness less than 100 nm.

In some embodiments, the cathode active material in this lithium battery is an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4, 5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4, 5,8-naphthalenetetraol formaldehyde polymer, Hexsazatrinaphthylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4, 5-tetrakis(propylthio)benzene] (PTKPTB, or poly[3,4(ethylenedithio)thiophene] (PEDTT).

In a preferred embodiment, the cathode active material is an organic material containing a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

In this lithium metal battery, the cathode active material constitutes an electrode active material loading greater than 30 mg/cm$^2$ (preferably greater than 40 mg/cm$^2$, more preferably greater than 45 mg/cm$^2$, and most preferably greater than 50 mg/cm$^2$) and/or wherein the consolidated cathode electrode has a thickness no less than 300 μm (preferably no less than 400 μm, more preferably no less than 500 μm, and can be greater than 600 μm).

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

This invention is directed at a process for producing a lithium battery exhibiting an exceptionally high volumetric energy density that has never been previously achieved. This lithium battery can be a primary battery, but is preferably a secondary battery selected from a lithium-ion battery or a lithium metal secondary battery (e.g. using lithium metal as an anode active material). The battery is based on an aqueous electrolyte, a non-aqueous or organic electrolyte, a gel electrolyte, an ionic liquid electrolyte, or a mixture of organic and ionic liquid. The shape of a lithium battery can be cylindrical, square, button-like, etc. The present invention is not limited to any battery shape or configuration.

For convenience, we select lithium iron phosphate (LFP), vanadium oxide ($V_xO_y$), dilithium rhodizonate ($Li_2C_6O_6$), and copper phthalocyanine (CuPc) as illustrative examples of the cathode active material, and graphite, SnO, $Co_3O_4$, and Si particles as examples of the anode active material. Nickel foam, graphite foam, graphene foam, and stainless steel fiber webs are used as examples of conductive porous layers as intended current collectors. These should not be construed as limiting the scope of the invention.

Figure 1A:
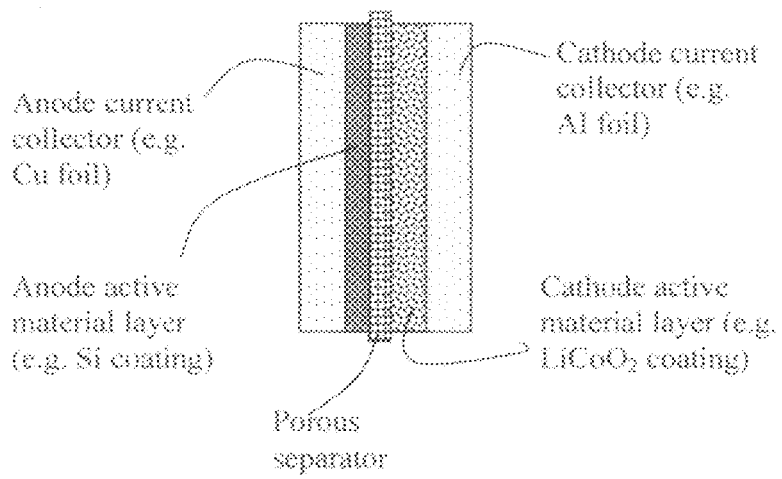
FIG. 1(A) schematic of a prior art lithium-ion battery cell composed of an anode current collector, an anode electrode (e.g. thin Si coating layer), a porous separator, a cathode electrode (e.g. sulfur layer), and a cathode current collector.
Figure 1B:
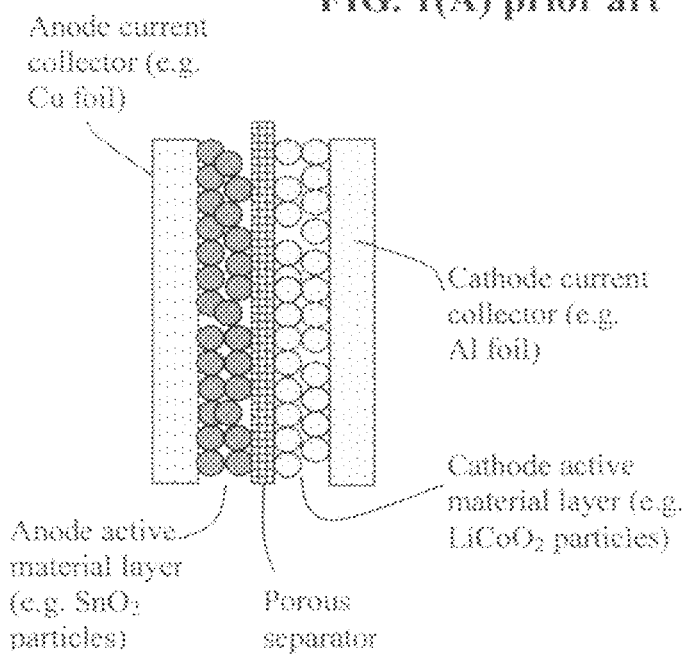
FIG. 1(B) schematic of a prior art lithium-ion battery, wherein the electrode layer is composed of discrete particles of an active material (e.g. graphite or tin oxide particles in the anode layer or LiCoO$_2$ in the cathode layer).

As illustrated in FIGS. 1(A) and 1(B), a lithium-ion battery cell is typically composed of an anode current collector (e.g. Cu foil), an anode electrode (anode active material layer), a porous separator and/or an electrolyte component, a cathode electrode (cathode active material layer), and a cathode current collector (e.g. Al foil). In a more commonly used cell configuration (FIG. 1(B)), the anode layer is composed of particles of an anode active material (e.g. graphite or Si), a conductive additive (e.g. carbon black particles), and a resin binder (e.g. SBR or PVDF). The cathode layer is composed of particles of a cathode active material (e.g. LFP particles), a conductive additive (e.g. carbon black particles), and a resin binder (e.g. PVDF). Both the anode and the cathode layers are typically up to 100-200 μm thick to give rise to a presumably sufficient amount of current per unit electrode area. With the conventional slurry coting and drying process, this thickness range is considered an industry-accepted constraint which a battery designer normally works under. This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); (c) thicker electrodes are prone to delaminate or crack upon drying or handling after roll-coating; and (d) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 1(A), either the anode active material (e.g. Si) or the cathode active material (e.g. lithium transition metal oxide) is deposited in a thin film form directly onto a current collector, such as a sheet of copper foil or Al foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking (for the anode) or to facilitate a full utilization of the cathode active material. Such a constraint further diminishes the total lithium storage capacity and the lithium storage capacity per unit electrode surface area. Such a thin-film battery has very limited scope of application.

On the anode side, a Si layer thicker than 100 nm has been found to exhibit poor cracking resistance during battery charge/discharge cycles. It takes but a few cycles to get fragmented. On the cathode side, a sputtered layer of lithium metal oxide thicker than 100 nm does not allow lithium ions to fully penetrate and reach full body of the cathode layer, resulting in a poor cathode active material utilization rate. A desirable electrode thickness is at least 100 μm, with individual active material coating or particle having a dimension desirably less than 100 nm. Thus, these thin-film electrodes (with a thickness <100 nm) directly deposited on a current collector fall short of the required thickness by three (3) orders of magnitude. As a further problem, all of the cathode active materials are not conductive to both electrons and lithium ions. A large layer thickness implies an excessively high internal resistance and a poor active material utilization rate.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electro-chemists alike for more than 30 years, by developing a new process of producing lithium batteries as herein disclosed.

The prior art lithium battery cell is typically made by a process that includes the following steps: (a) The first step is mixing particles of the anode active material (e.g. Si nano particles or meso-carbon micro-beads, MCMBs), a conductive filler (e.g. graphite flakes), a resin binder (e.g. PVDF) in a solvent (e.g. NMP) to form an anode slurry. On a separate basis, particles of the cathode active material (e.g. LFP particles), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a lithium battery cell.

There are several serious problems associated with the conventional process and the resulting lithium-ion battery cell:
1) It is very difficult to produce an electrode layer (anode layer or cathode layer) that is thicker than 200 μm (100 μm on each side of a solid current collector, such as Al foil). There are several reasons why this is the case. An electrode of 100-200 μm in thickness typically requires a heating zone of 30-50 meters long in a slurry coating facility, which is too time consuming, too energy intensive, and not cost-effective. For some electrode active materials, such as metal oxide particles, it has not been possible to produce an electrode of good structural integrity that is thicker than 100 μm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a gravimetric energy density of >200 Wh/kg. In most cases, the anode active material mass loading of the electrodes (areal density) is significantly lower than 25 mg/cm$^2$ and the apparent volume density or tap density of the active material is typically less than 1.2 g/cm$^3$ even for relatively large particles of graphite. The cathode active material mass loading of the electrodes (areal density) is significantly lower than 45 mg/cm$^2$ for lithium metal oxide-type inorganic materials and lower than 15 mg/cm$^2$ for organic or polymer materials. In addition, there are so many other non-active materials (e.g. conductive additive and resin binder) that add additional weights and volumes to the electrode without contributing to the cell capacity. These low areal densities and low volume densities result in relatively low gravimetric energy density and low volumetric energy density.

3) The conventional process requires dispersing electrode active materials (anode active material or cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process does not sound like a good process at all.

4) Current lithium-ion batteries still suffer from a relatively low gravimetric energy density and low volumetric energy density. Commercially available lithium-ion batteries exhibit a gravimetric energy density of approximately 150-220 Wh/kg and a volumetric energy density of 450-600 Wh/L.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. graphite or carbon) in a lithium-ion battery being typically from 12% to 17%, and that of the cathode active material (e.g. LiMn$_2$O$_4$) from 20% to 35%.

Figure 1C:
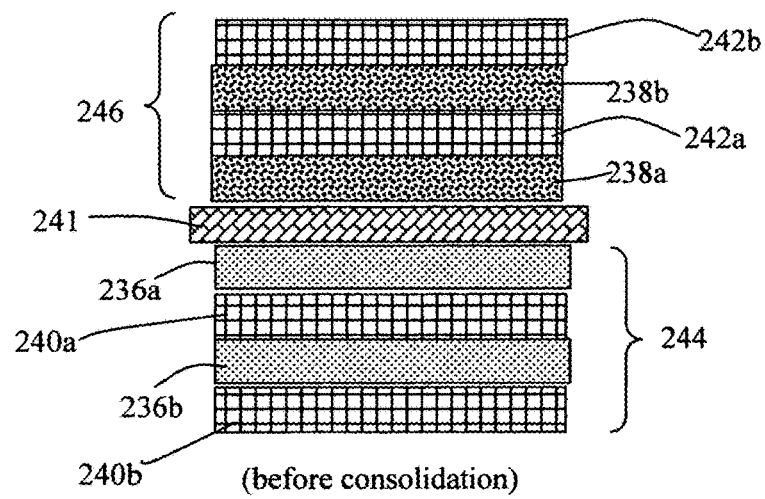
FIG. 1(C) Schematic of a presently invented lithium-ion battery cell, comprising (i) a stack of alternatingly configured conductive porous layers and wet anode layers, (ii) a porous separator, and (iii) a stack of alternatingly configured conductive porous layers and wet cathode layers prior to consolidation (e.g. via compression) of multiple porous layers (as a backbone of a current collector) and wet electrode layers together to achieve infiltration of porous layers by the anode active material and liquid electrolyte (and optional conductive additive) to form the anode electrode and prior to infiltration of porous layers by the cathode active material and liquid electrolyte (and optional conductive additive) to form the cathode electrode.
Figure 1D:
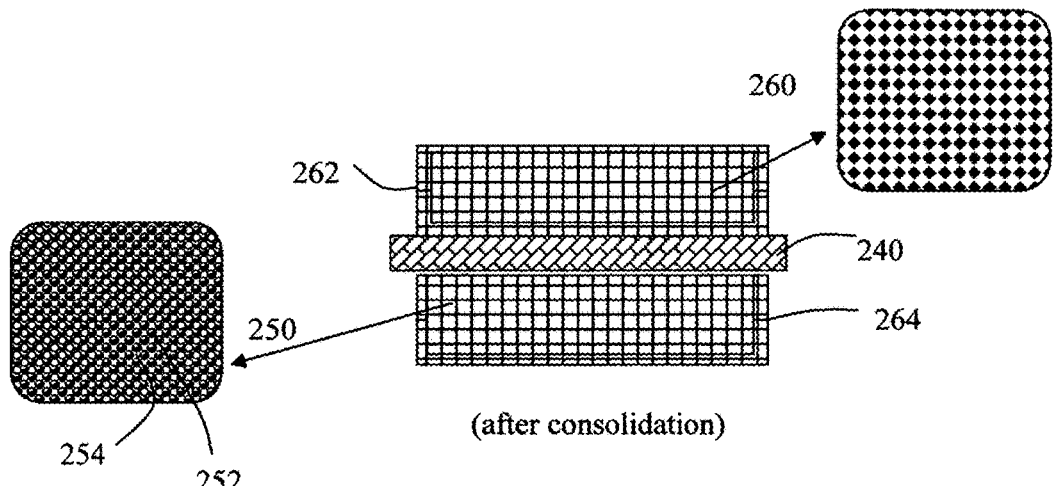
FIG. 1(D) Schematic of a presently invented lithium-ion battery cell, as illustrated in FIG. 1(C), but after consolidation (e.g. via compression) of multiple porous layers (as a backbone of a current collector) and wet electrode layers together to achieve infiltration of porous layers by the anode active material and liquid electrolyte (and optional conductive additive) to form the anode electrode and after infiltration of porous layers by the cathode active material and liquid electrolyte (and optional conductive additive) to form the cathode electrode FIG. 1(E) Schematic of a presently invented lithium battery cell, comprising an anode current collector containing a layer of lithium metal or lithium metal alloy deposited thereon, a porous separator, and a stack of alternatingly placed conductive porous layers and cathode layers before (top portion) and after (lower portion) of consolidation and infiltration of cathode active material and liquid electrolyte into pores of the porous layers.
Figure 3A:
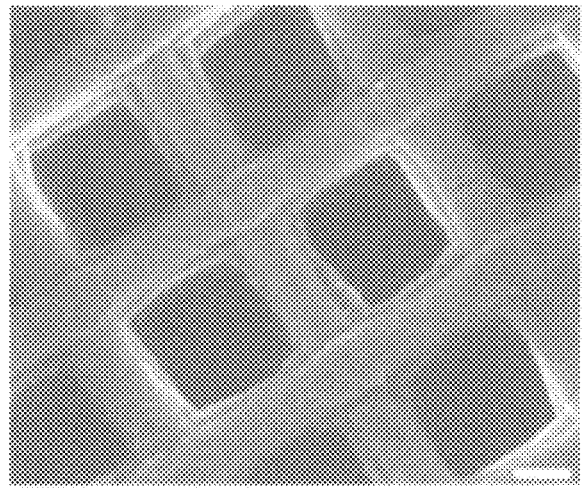
FIG. 3(A) Examples of conductive porous layers: metal grid/mesh and carbon nano-fiber mat.
Figure 3A:
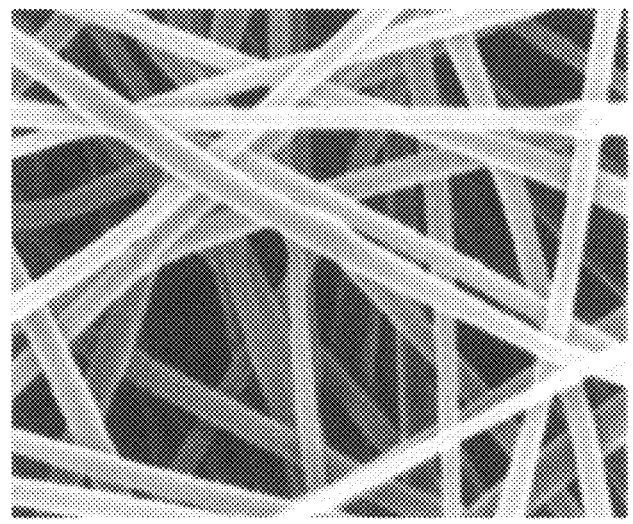
Figure 3B:
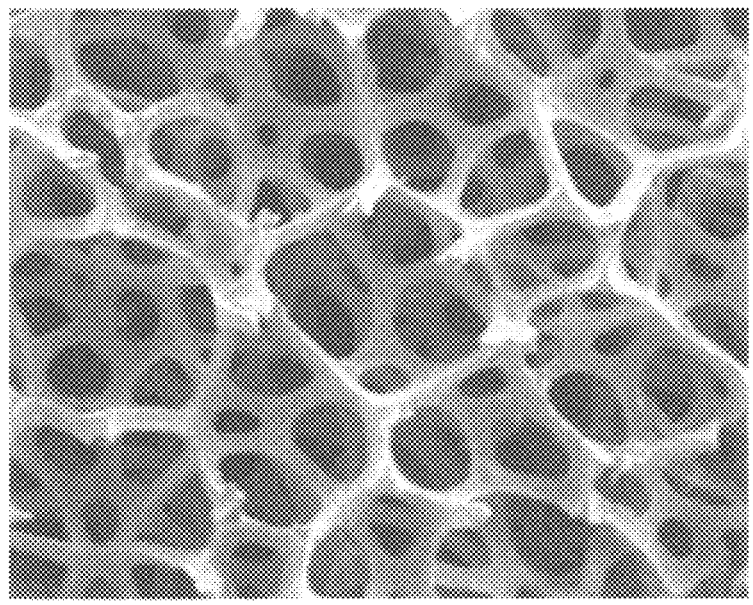
FIG. 3(B) Examples of conductive porous layers: graphene foam and carbon foam.
Figure 3B:
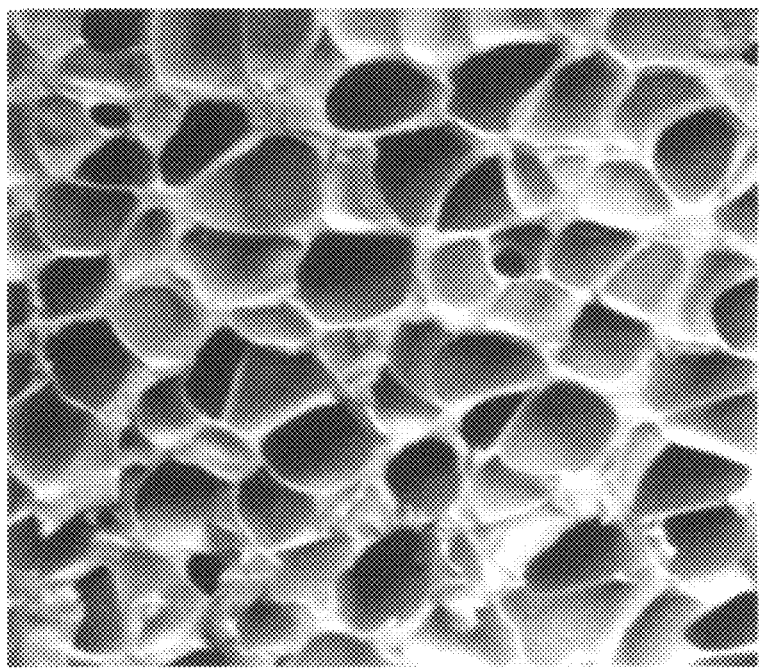
Figure 3C:
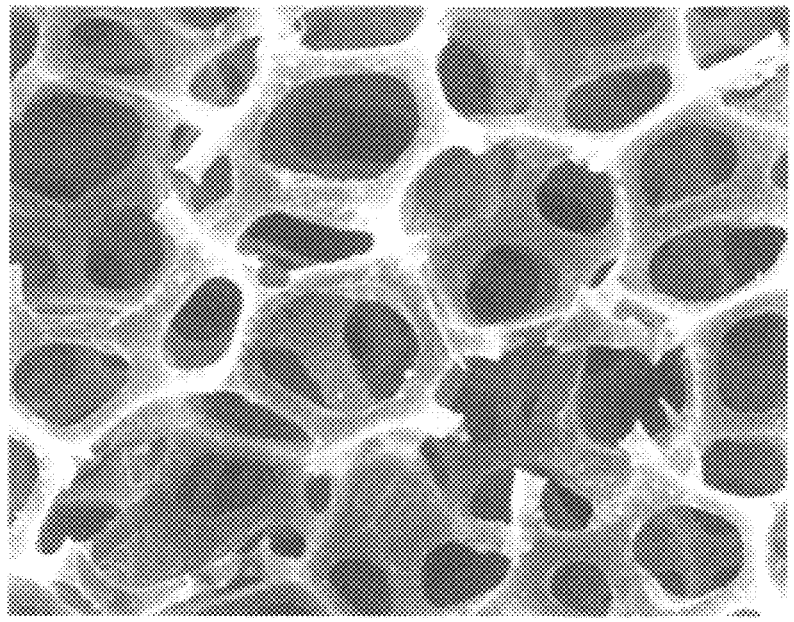
FIG. 3(C) Examples of conductive porous layers: graphite foam and Ni foam.
Figure 3C:
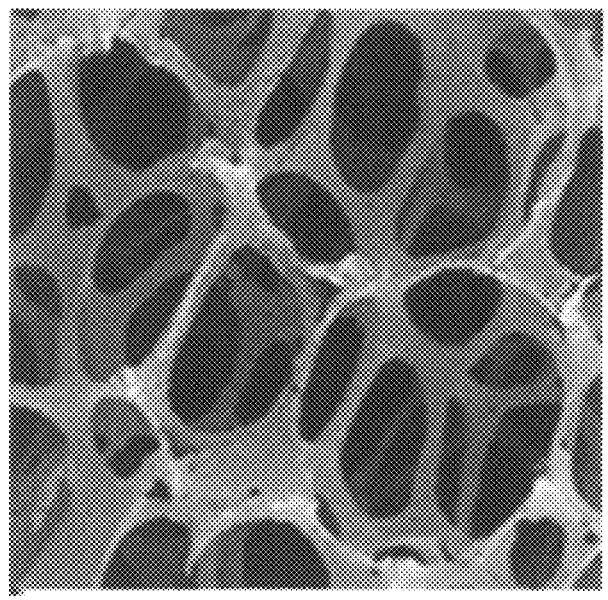
Figure 3D:
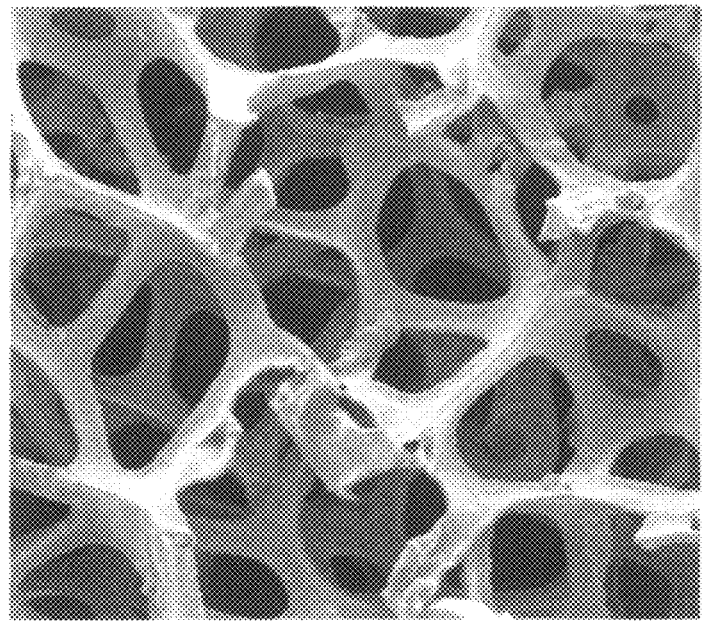
FIG. 3(D) Examples of conductive porous layers: Cu foam and stainless steel foam.
Figure 3D:
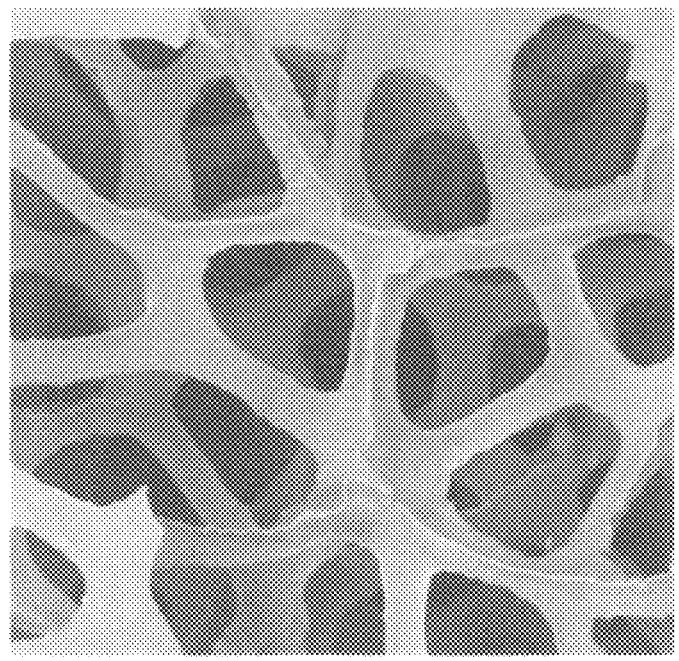

The present invention provides a process for producing a lithium battery cell having a large electrode thickness (referring to the thickness of the electrode that contains electrode active materials, not including the thickness of any active material-free current collector layer, if existing), high active material mass loading, low overhead weight and volume, high volumetric capacitance, and high volumetric energy density. In one embodiment, as illustrated in FIGS. 1(C) and 1(D), the invented process comprises:

(A) Preparing a plurality of electrically conductive porous layers (e.g. 240a, 240b at the anode side and 242a, 242b at the cathode side), a plurality of wet anode layers (e.g. 236a, 236b) of an anode active material and an optional conductive additive mixed with a first liquid electrolyte, and a plurality of wet cathode layers (e.g. 238a, 238b) of a cathode active material and an optional conductive additive mixed with a second liquid electrolyte, wherein the conductive porous layers contain interconnected conductive pathways and at least 80% by volume of pores;

(B) Stacking and consolidating a desired number of porous layers and a desired number of wet anode layers in an alternating manner (e.g. 244, shown prior to consolidation) to form an anode electrode (e.g. 264 in FIG. 1(D), after consolidation) having a thickness no less than 100 μm (preferably >200 μm, further preferably >300 μm, more preferably >400 μm; further more preferably >500 μm, 600 μm, or even >1,000 μm; no theoretical limitation on this anode thickness). Consolidation may involve the application of a compressive stress to force the wet anode layer ingredients to infiltrate into the pores of the multiple conductive porous layers. These multiple conductive porous layers are also compressed together to form an anode current collector that essentially extends over the thickness of the entire anode electrode 264;

(C) Placing a porous separator layer (241 in FIG. 3(C) or 3(D)) in contact with the anode electrode;

(D) Stacking and consolidating a desired number of conductive porous layers and a desired number of wet cathode layers in an alternating manner (e.g. 246, shown prior to consolidation) to form a cathode electrode (e.g. 262 in FIG. 1(D), after consolidation) in contact with the porous separator 241, wherein the cathode electrode has a thickness no less than 100 μM; wherein step (D) is conducted before or after step (B); The cathode thickness is preferably >200 μm, further preferably >300 μm, more preferably >400 μm; further more preferably >500 μm, 600 μm, or even >1,000 μm; no theoretical limitation on this cathode thickness. Consolidation may involve the application of a compressive stress to force the wet cathode layer ingredients to infiltrate into the pores of the multiple conductive porous layers. These multiple conductive porous layers are also compressed together to form a cathode current collector that essentially extends over the entire thickness of the cathode electrode 262; and (E) Assembling and sealing the anode electrode, porous separator, and cathode electrode in a housing to produce the lithium battery;

In this battery, the anode active material has a material mass loading no less than 20 mg/cm$^2$ in the anode electrode and/or the cathode active material has a material mass loading no less than 15 mg/cm$^2$ for an organic or polymer material or no less than 30 mg/cm$^2$ for an inorganic and non-polymer material in the cathode electrode.

It may be noted that, if we pick a small zone 250 in the anode 264, we will find anode active material particles 252 (plus optional conductive additive) dispersed in a liquid electrolyte. If we pick a small zone 260 in the cathode, we will find cathode material particles (plus optional conductive additive) dispersed in a liquid electrolyte.

The electrically conductive porous layers may be selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerox gel, graphene foam, graphene oxide foam, reduced graphene oxide foam, carbon fiber foam, graphite fiber foam, exfoliated graphite foam, or a combination thereof. The porous layers must be made of an electrically conductive material, such as a carbon, graphite, metal, metal-coated fiber, and conductive polymer, which is in a form of highly porous mat, screen/grid, non-woven, foam, etc. Examples of conductive porous layers are presented in FIGS. 3(A), 3(B), 3(C), and 3(D). The porosity level must be at least 70% by volume, preferably greater than 80%, further preferably greater than 90%, and most preferably greater than 95% by volume. The backbone or foam walls form a network of electron-conducting pathways.

Preferably, substantially all of the pores in the original conductive porous layers are filled with the electrode (anode or cathode) active material, optional conductive additive, and liquid electrolyte (no binder resin needed). Since there are great amounts of pores (80-99%) relative to the pore walls or conductive pathways (1-20%), very little space is wasted ("being wasted" means not being occupied by the electrode active material and electrolyte), resulting in high amounts of electrode active material-electrolyte zones (high active material loading mass).

Figure 1E:
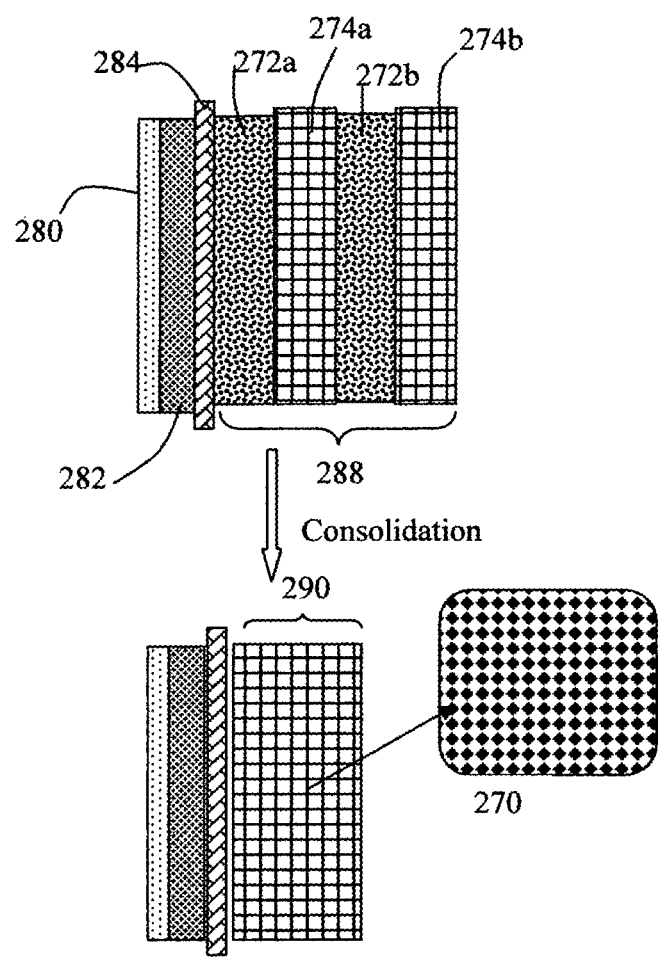
Figure 2:
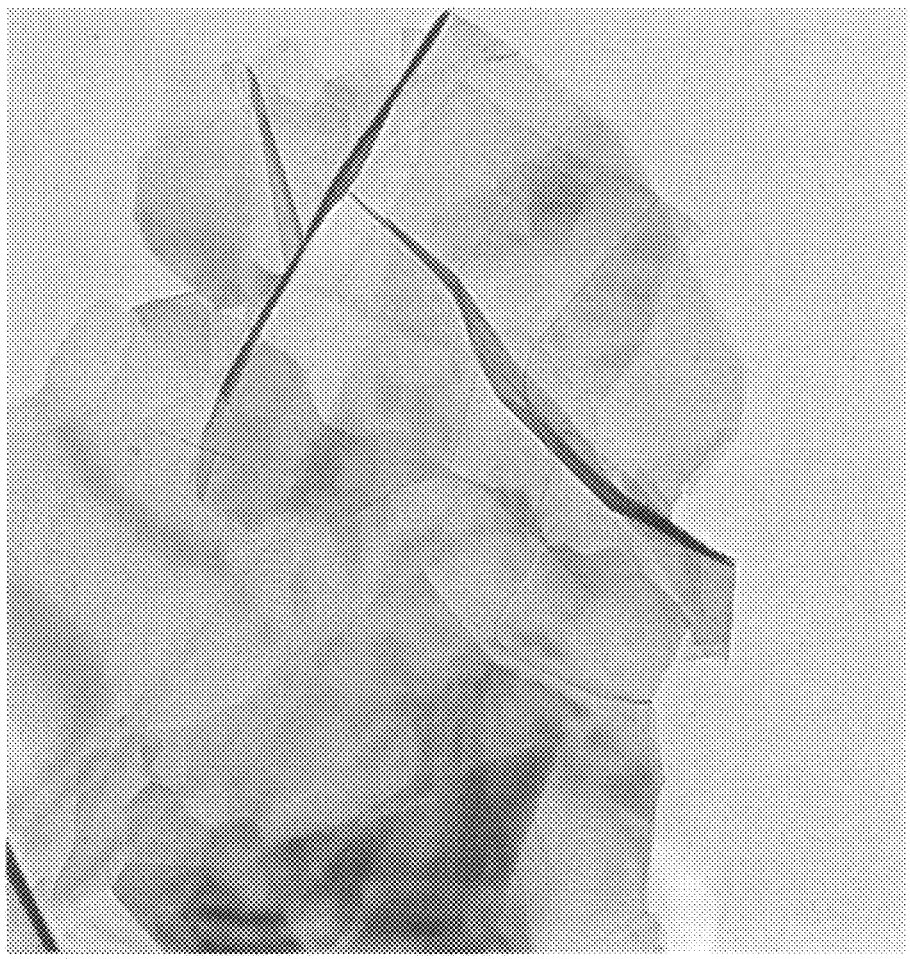
FIG. 2 An electron microscopic image of graphene sheets.

An alternative configuration, schematically illustrated in FIG. 1(E), is a presently invented lithium battery cell, comprising an anode current collector 280 containing a layer of lithium metal 282 or lithium metal alloy deposited thereon, a porous separator 284, and a stack 288 of alternatingly arranged conductive porous layers (e.g. 274a, 274b), intended for use as part of a cathode current collector, and wet cathode layers (e.g. 272a, 272b) prior to being consolidated (compressed). Upon consolidation, the cathode active material and the liquid electrolyte (along with any optional conductive additive) are forced to permeate into pores of the conductive porous layers, which are also compressed to form a cathode layer 290. The pores 270 of this foamed current collector have been impregnated with a mixture of cathode active material particles and liquid electrolyte.

In such configurations (FIG. 1(C)-(E)), the electrons only have to travel a short distance (half of the pore size, on average; e.g. a few micrometers) before they are collected by the current collector (pore walls) since pore walls are present everywhere throughout the entire current collector (also the entire anode layer). Additionally, in each wet anode layer or wet cathode layer, all electrode active material particles are pre-dispersed in a liquid electrolyte (no wettability issue), eliminating the existence of dry pockets commonly present in an electrode prepared by the conventional process of wet coating, drying, packing, and electrolyte injection. Thus, the presently invented process produces a totally unexpected advantage over the conventional battery cell production process.

In a preferred embodiment, the anode active material is a prelithiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nanotube, or a combination thereof. Graphene materials are also a good conductive additive for both the anode and cathode active materials of a lithium battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 4A:
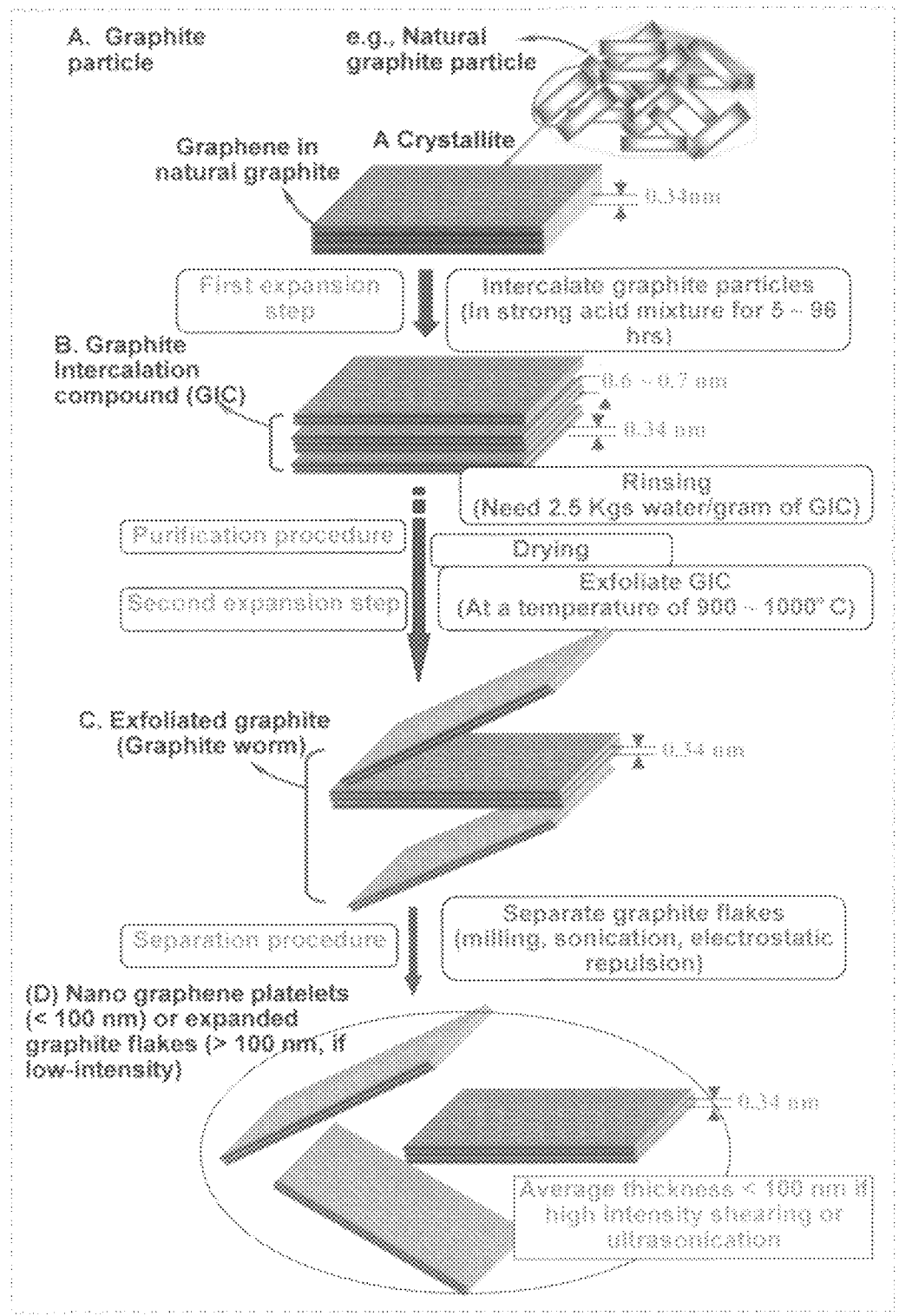
FIG. 4(A) Schematic of a commonly used process for producing exfoliated graphite, expanded graphite flakes (thickness >100 nm), and graphene sheets (thickness <100 nm, more typically <10 nm, and can be as thin as 0.34 nm).
Figure 4:
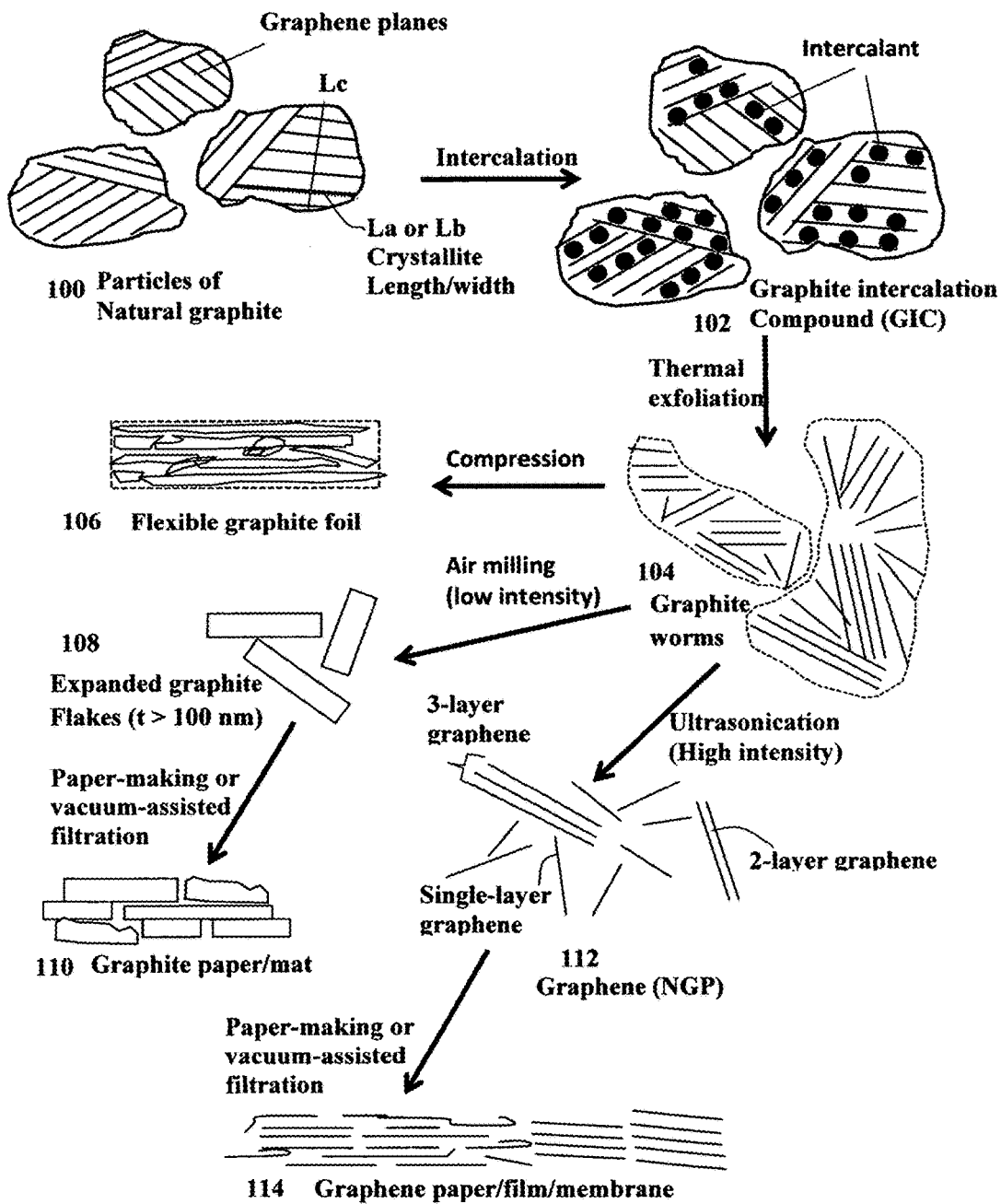
FIG. 4 (B) Schematic drawing to illustrate the processes for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1 A, these graphite worms (exfoliated graphite or "networks of interconnected/non-separated graphite flakes") can be re-compressed to obtain flexible graphite sheets or foils (106) that typically have a thickness in the range of 0.1 mm (100 µm)-0.5 mm (500 µm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 µm to 10 µm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting—OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 4(B)) using a film- or paper-making process. Alternatively, with a low-intensity shearing, graphite worms tend to be separated into the so-called expanded graphite flakes (108 in FIG. 4(B) having a thickness >100 nm. These flakes can be formed into graphite paper or mat 106 using a paper- or mat-making process, with or without a resin binder.

There is no restriction on the types of anode active materials or cathode active materials that can be used in practicing the instant invention. Preferably, in the invented process, the anode active material absorbs lithium ions at an electrochemical potential of less than 1.0 volt (preferably less than 0.7 volts) above the Li/Li$^+$ (i.e. relative to Li→Li$^+$+ e$^-$ as the standard potential) when the battery is charged. In one preferred embodiment, the anode active material is selected from the group consisting of:

(a) Particles of natural graphite, artificial graphite, meso-carbon microbeads (MCMB), and carbon (including soft carbon, hard carbon, carbon nano-fiber, and carbon nano-tube);
(b) Silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd); (Si, Ge, Al, and Sn are most desirable due to their high specific capacities.)
(c) Alloys or intermetallic compounds of Si, Ge, Sn, Pb, Sb, Bi, Zn, Al, or Cd with other elements, wherein said alloys or compounds are stoichiometric or non-stoichiometric (e.g. SiAl, SiSn);
(d) Oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites (e.g. SnO, TiO$_2$, Co$_3$O$_4$, etc.);
(e) Pre-lithiated versions thereof (e.g. pre-lithiated TiO$_2$, which is lithium titanate);
(f) Pre-lithiated graphene sheets; and combinations thereof.

A wide variety of cathode active materials can be used to practice the presently invented process. The cathode active material typically is a lithium intercalation compound or lithium-absorbing compound that is capable of storing lithium ions when the lithium battery is discharged and releasing lithium ions into the electrolyte when rec-charged. The cathode active material may be selected from an inorganic material, an organic or polymeric material, a metal oxide/phosphate/sulfide (most desired types of inorganic cathode materials), or a combination thereof:

The group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide, lithium iron phosphate, lithium manganese phosphate, lithium vanadium phosphate, lithium mixed metal phosphates, transition metal sulfides, and combinations thereof. In particular, the lithium vanadium oxide may be selected from the group consisting of VO$_2$, Li$_x$VO$_2$, V$_2$O$_5$, Li$_x$V$_2$O$_5$, V$_3$O$_8$, Li$_x$V$_3$O$_8$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein 0.1<x<5. Lithium transition metal oxide may be selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

Other inorganic materials for use as a cathode active material may be selected from sulfur, sulfur compound, lithium polysulfide, transition metal dichalcogenide, a transition metal trichalcogenide, or a combination thereof. In particular, the inorganic material is selected from TiS$_2$, TaS$_2$, MoS$_2$, NbSe$_3$, MnO$_2$, CoO$_2$, an iron oxide, a vanadium oxide, or a combination thereof. These will be further discussed later.

In particular, the inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexanzatrinaphtylene (HATN), Hexaazatriphenylene hexacarbonitrile (HAT (CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may be selected from a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The lithium intercalation compound or lithium-absorbing compound may be selected from a metal carbide, metal nitride, metal boride, metal dichalcogenide, or a combination thereof. Preferably, the lithium intercalation compound or lithium-absorbing compound is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

We have discovered that a wide variety of two-dimensional (2D) inorganic materials can be used as a cathode active material in the presented invented lithium battery prepared by the invented direct active material-electrolyte injection process. Layered materials represent a diverse source of 2D systems that can exhibit unexpected electronic properties and good affinity to lithium ions. Although graphite is the best known layered material, transition metal dichalcogenides (TMDs), transition metal oxides (TMOs), and a broad array of other compounds, such as BN, Bi$_2$Te$_3$, and Bi$_2$Se$_3$, are also potential sources of 2D materials.

Preferably, the lithium intercalation compound or lithium-absorbing compound is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. The lithium intercalation compound or lithium-absorbing compound may contain nano discs, nano platelets, nano-coating, or nano sheets of a compound selected from: (i) bismuth selenide or bismuth telluride, (ii) transition metal dichalcogenide or trichalcogenide, (iii) sulfide, selenide, or telluride of niobium, zirconium, molybdenum, hafnium, tantalum, tungsten, titanium, cobalt, manganese, iron, nickel, or a transition metal; (iv) boron nitride, or (v) a combination thereof, wherein the discs, platelets, coating, or sheets have a thickness less than 100 nm.

Non-graphene 2D nano materials, single-layer or few-layer (up to 20 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (IMF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In what follows, we provide some examples of several different types of anode active materials, cathode active materials, and conductive porous layers (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

EXAMPLE 1

Illustrative Examples of Electronically Conductive Porous Layers as a Porous Building Block for Current Collectors Various types of metal foams and fine metal webs/screens are commercially available for use as an anode or cathode foam structure (current collector); e.g. Ni foam, Cu foam, Al foam, Ti foam, Ni mesh/web, stainless steel fiber mesh, etc. Metal-coated polymer foams and carbon foams are also used as current collectors. The most desirable thickness ranges for these conductive porous layers are 50-1000 μm, preferably 50-500 μm, more preferably 50-200 μm.

EXAMPLE 2

Ni Foam and CVD Graphene Foam-Based Porous Layers Supported on Ni Foam Templates The procedure for producing CVD graphene foam was adapted from that disclosed in open literature: Chen, Z. et al. "Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, we used a conducting polymer as a binder resin to hold graphene together while Ni was etched away. The graphene foam or Ni foam thickness range is from 35 μm to 600 μm.

The layers of Ni foam or the CVD graphene foam used herein is intended as conductive porous layers (CPL) to accommodate the ingredients (anode or cathode active material+optional conductive additive+liquid electrolyte) of wet anode layers (WAL) or wet cathode layers (WCL). For instance, Si nano particles dispersed in an organic liquid electrolyte (e.g. 1-4.0 M of $LiPF_6$ dissolved in PC-EC) are made into gel-like or semi-rigid wet anode, and graphene-supported LFP nano particles dispersed in the same liquid electrolyte are made into wet cathode layers. These CPLs and WALs or WDLs, along with a porous separator layer (PSL) are then stacked together to form a lithium-ion cell in the following sequence (as an example): CPL/WAL/CPL/WAL/CPL/WAL/PSL/WDL/CPL/WDL/CPL/WDL/CPL. With a compression force, these layers are consolidated together to make a battery cell of anode/PSL/cathode. In this battery cell, the anode is now composed of three compacted CPLs (overlaying one another) wherein their pores are impregnated with Si nano particles and organic liquid electrolyte to form the anode electrode; these three CPLs also serving as an anode current collector. The cathode is now composed of three compacted CPLs (overlaying one another) wherein their pores are impregnated with graphene-supported LFP nano particles and organic liquid electrolyte to form the anode electrode; these three CPLs also serving as a cathode current collector. The anode current collector substantially covers the entire anode electrode thickness and the cathode current collector substantially covers the entire cathode electrode thickness.

EXAMPLE 3

Graphitic Foam-Based Conductive Porous Layers from Pitch-Based Carbon Foams

Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon. The graphite foam layers are available in a thickness range of 75-500 μm.

EXAMPLE 4

Preparation of Graphene Oxide (GO) and Reduced Graphene Oxide (RGO) Nano Sheets from Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode active material in certain lithium batteries presently invented. Pre-lithiated RGO (e.g. RGO+ lithium particles or RGO pre-deposited with lithium coating) was also use as an anode active material that is mixed with a liquid electrolyte to form wet anode layers for selected lithium-ion cells. Selected cathode active materials ($TiS_2$ nano particles and $LiCoO_2$ particles, respectively) and non-lithiated RGO sheets are dispersed in a liquid electrolyte to prepare wet cathode layers. A stack of multiple conductive porous layers (Cu foam) and multiple wet anode layers, a porous separator layer, and a stack of multiple conductive porous layers (Al foam) and multiple wet cathode layers are then stacked and compacted together to form a battery cell.

For comparison purposes, slurry coating and drying procedures were conducted to produce conventional electrodes. Electrodes and a separator disposed between two dried electrodes were then assembled and encased in an Al-plastic laminated packaging envelop, followed by liquid electrolyte injection to form a lithium battery cell.

EXAMPLE 5

Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity. Pre-lithiated pristine graphene was also used as an anode active material. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure of slurry injection into foam pores and conventional procedure of slurry coating, drying and layer laminating. Both lithium-ion batteries and lithium metal batteries (injection into cathode only) were investigated.

EXAMPLE 6

Preparation of Prelithiated Graphene Fluoride Sheets as an Anode Active Material of a Lithium-Ion Battery Several processes have been used by us to produce GF, but only one process is herein described as an example. In a typical procedure, highly exfoliated graphite (HEG) was prepared from intercalated compound $C_2F.xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of BEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with surface-stabilized lithium powder in a liquid electrolyte, allowing for pre-lithiation to occur before or after injection into pores of an anode current collector.

EXAMPLE 7

Lithium Iron Phosphate (LFP) Cathode of a Lithium Metal Battery

LFP powder, un-coated or carbon-coated, is commercially available from several sources. A LFP target for sputtering was prepared by compacting and sintering LFP powders together. Sputtering of LFP was conducted on a graphene film and, separately, carbon nano-fiber (CNF) mat. The LFP-coated graphene film was then broken and pulverized to form LFP-coated graphene sheets.

Both carbon-coated LFP powder and graphene-supported LFP, separately, along with a liquid electrolyte, were then incorporated in a battery using both the presently invented procedure of compacting a stack of multiple porous layers and wet cathode layers alternatingly stacked together, and the conventional procedure of slurry coating, drying and layer laminating.

EXAMPLE 8

$V_2O_5$ as an Example of a Transition Metal Oxide Cathode Active Material of a Lithium Battery $V_2O_5$ powder alone is commercially available. For the preparation of a graphene-supported $V_2O_5$ powder sample, in a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced composite particulates.

Both $V_2O_5$ powder (with a carbon black powder as a conductive additive) and graphene-supported $V_2O_5$ powder, separately, along with a liquid electrolyte, were then incorporated in a battery using both the presently invented process and the conventional procedure of slurry coating, drying and layer laminating.

EXAMPLE 9

LiCoO$_2$ as an Example of Lithium Transition Metal Oxide Cathode Active Material for a Lithium-Ion Battery Commercially available LiCoO$_2$ powder and carbon black powder were dispersed in a liquid electrolyte to form wet cathode layers, which were alternatingly stacked with multiple layers of Ni foam-based cathode current collector layers to form a cathode stack. Multiple layers of graphite particle-liquid electrolyte (i.e. the wet anode layers) were stacked with multiple layers of multiple Cu foam layers in an alternating sequence to form an anode stack. Additionally, a stack of wet anode layers were also prepared from a mixture of graphene embraced Si nano particles and liquid electrolyte. An anode stack, a porous separator layer, and a cathode stack were assembled, compacted, and encased in a plastic-Al envelop to form a battery cell. The cell was then hermetically sealed.

On a separate basis, LiCoO$_2$ powder, carbon black powder, and PVDF resin binder were dispersed in NMP solvent to form a slurry, which was coated onto both sides of a AL foil current collector and then dried under vacuum to form a cathode layer. Graphite particles and PVDF resin binder were dispersed in NMP solvent to form a slurry, which was coated onto both sides of a Cu foil current collector and then dried under vacuum to form an anode layer. The anode layer, separator, cathode layer were then laminated and encased in an Al-plastic housing, which was injected with a liquid electrolyte to form a conventional lithium-ion battery.

EXAMPLE 10

Organic Material (Li$_2$C$_6$O$_6$) as a Cathode Active Material of a Lithium Metal Battery In order to synthesize dilithium rhodizonate (Li$_2$C$_6$O$_6$), the rhodizonic acid dihydrate (species 1 in the following scheme) was used as a precursor. A basic lithium salt, Li$_2$CO$_3$, can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

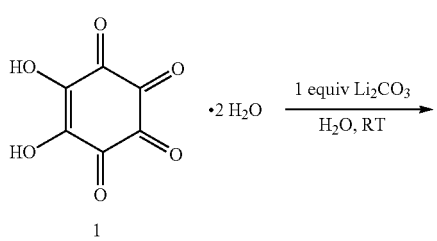

1

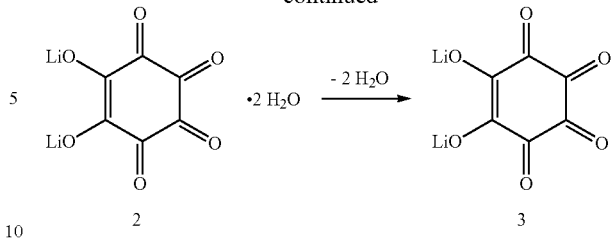

2   3

A mixture of a cathode active material (Li$_2$C$_6$O$_6$) and a conductive additive (carbon black, 15%) was ball-milled for 10 minutes and the resulting blend was grinded to produce composite particles. The electrolyte was 1M of lithium hexafluorophosphate (LiPF$_6$) in PC-EC.

It may be noted that the two Li atoms in the formula Li$_2$C$_6$O$_6$ are part of the fixed structure and they do not participate in reversible lithium ion storing and releasing. This implies that lithium ions must come from the anode side. Hence, there must be a lithium source (e.g. lithium metal or lithium metal alloy) at the anode. As illustrated in FIG. 1(E), the anode current collector (Cu foil) is deposited with a layer of lithium (e.g. via sputtering or electrochemical plating). This can be done prior to assembling the lithium-coated layer (or simply a lithium foil), a porous separator, and a stack of conductive porous layers and wet cathode layers into a casing envelop. Under a compression force, the pores of the conductive porous layers are infiltrated with the cathode active material and conductive additive (Li$_2$C$_6$O$_6$/C composite particles) wetted with the liquid electrolyte. For comparison, the corresponding conventional Li metal cell was also fabricated by the conventional procedures of slurry coating, drying, laminating, packaging, and electrolyte injection.

EXAMPLE 11

Metal Naphthalocyanine-RGO Hybrid Cathode of a Lithium Metal Battery

CuPc-coated graphene sheets were obtained by vaporizing CuPc in a chamber along with a graphene film (5 nm) prepared from spin coating of RGO-water suspension. The resulting coated film was cut and milled to produce CuPc-coated graphene sheets, which were used as a cathode active material in a lithium metal battery having a lithium metal foil as the anode active material and 1-3.6 M of LiClO$_4$ in propylene carbonate (PC) solution as the electrolyte.

EXAMPLE 12

Preparation of MoS$_2$/RGO Hybrid Material as a Cathode Active Material of a Lithium Metal Battery A wide variety of inorganic materials were investigated in this example. For instance, an ultra-thin MoS$_2$/RGO hybrid was synthesized by a one-step solvothermal reaction of (NH$_4$)$_2$MoS$_4$ and hydrazine in an N, N-dimethylformamide (DMF) solution of oxidized graphene oxide (GO) at 200° C. In a typical procedure, 22 mg of (NH$_4$)$_2$MoS$_4$ was added to 10 mg of GO dispersed in 10 ml of DMF. The mixture was sonicated at room temperature for approximately 10 min until a clear and homogeneous solution was obtained. After that, 0.1 ml of N$_2$H$_4$.H$_2$O was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried, mixed with liquid electrolyte and made into multiple wet cathode layers.

EXAMPLE 13

Preparation of Two-Dimensional (2D) Layered $Bi_2Se_3$ Chalcogenide Nanoribbons

The preparation of (2D) layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were used as a cathode active material of a lithium metal battery.

EXAMPLE 14

MXenes Powder+Chemically Activated RGO

Selected MXenes, were produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $Nb_2CT_x$, $V_2CT_x$, $Ti_3CNT_x$, and $Ta_4C_3T_x$. Typically, 35-95% MXene and 5-65% graphene sheets were mixed in a liquid electrolyte to form wet cathode layers.

EXAMPLE 15

Preparation of Graphene-Supported $MnO_2$ Cathode Active Material

The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO solution were added in the solution, which was ultrasonicated for 30 min to prepare a dark brown precipitate. The product was separated, washed several times with distilled water and ethanol, and dried at 80° C. for 12 h. The sample is graphene-supported $MnO_2$ in a powder form, which was mixed in a liquid electrolyte to form wet cathode layers.

EXAMPLE 16

Graphene-Enhanced Nano Silicon Fabricated from TEOS as an Anode Active Material of a Lithium-Ion Battery Dilute 1 wt. % N002-PS to 0.2 wt. % N002-PS by DI water, and place the diluted PS solution to the ultrasonic bath and ultrasonic process for 30 minutes. Gradually add TEOS (0.2 wt. % N002-PS: TEOS=5:2) while stirring the PS solution. Then, keep stirring for 24 hours to get a complete hydrolysis of TEOS. Dropwise add 10% $NH_3.H_2O$ till the formation of gel, and the gel can be called as TP gel. Grind the TP gel to tiny particles. Oven dries at 120° C. for 2 hours, at 150° C. for 4 hours. Mix the dried TP particles with Mg in a ratio of 10:7. Use 20 times amount of 7 mm SS balls and ball mill under Argon protection, gradually increase the rotating speed to 250 rpm. Put certain amount of TPM powders in Nickel crucible and heat treatment at 680° C. Prepare certain amount of 2M HCl solution. Then gradually add heat treated TPM powders to the acid solution. Keep the reaction for 2-24 hours, and then put the turbid liquid to the ultrasonic bath and ultrasonic process for 1 hour. Pour out the suspension to the filtration system. Discard the bottom large particles. Use DI water to rinse three times. Dry the yellow paste and blend the yellow paste to powders. The as-prepared nano particle has a SSA value range of 30 $m^2/g$ to 200 $m^2/g$ due to different ratio of graphene contents A certain amount of the dried TPM particles is then put into muffle furnace and calcined at 400° C.-600° C. for 2 hours under air purging to remove the carbon content from the nanocomposite, producing graphene-free yellow-color silicon nano powders. Both Si nano powder and graphene-wrapped Si nano particles were used as a high-capacity anode active material.

EXAMPLE 17

Cobalt Oxide ($Co_3O_4$) Particulates as an Anode Active Material

Although $LiCoO_2$ is a cathode active material, $Co_3O_4$ is an anode active material of a lithium-ion battery since $LiCoO_2$ is at an electrochemical potential of approximately +4.0 volts relative to $Li/Li^+$ and $Co_3O_4$ is at an electrochemical potential of approximately +0.8 volts relative to $Li/Li^+$.

An appropriate amount of inorganic salts $Co(NO_3)_2.6H_2O$ and, subsequently, ammonia solution ($NH_3.H_2O$, 25 wt %) were slowly added into a GO suspension. The resulting precursor suspension was stirred for several hours under an argon flow to ensure a complete reaction. The obtained $Co(OH)_2$/graphene precursor suspension was divided into two portions. One portion was filtered and dried under vacuum at 70° C. to obtain a $Co(OH)_2$/graphene composite precursor. This precursor was calcined at 450° C. in air for 2 h to form the layered $Co_3O_4$/graphene composites, which are characterized by having $Co_3O_4$-coated graphene sheets overlapping one another. These $Co_3O_4$-coated graphene sheets are another high-capacity anode active material.

EXAMPLE 18

Graphene-Enhanced Tin Oxide Particulates as an Anode Active Material

Tin oxide ($SnO_2$) nano particles, an anode active material, were obtained by the controlled hydrolysis of $SnCl_4.5H_2O$ with NaOH using the following procedure: SnCl$_4$·5H$_2$O (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 min. Subsequently, the resulting hydrosol was reacted with the GO dispersion for 3 hours. To this mixed solution, few drops of 0.1 M of H$_2$SO$_4$ were added to flocculate the product. The precipitated solid was collected by centrifugation, washed with water and ethanol, and dried in vacuum. The dried product was heat-treated at 400° C. for 2 h under Ar atmosphere.

EXAMPLE 19

Preparation and Electrochemical Testing of Various Battery Cells

For most of the anode and cathode active materials investigated, we prepared lithium-ion cells or lithium metal cells using both the presently invented method and the conventional method.

With the conventional method, a typical anode composition includes 85 wt. % active material (e.g., Si- or Co$_3$O$_4$-coated graphene sheets), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. With the instant method, typically no binder resin is needed or used, saving 8% weight (reduced amount of non-active materials). Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M LiPF$_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In some examples of the presently invented process, we assembled typically 1-5 conductive porous layers (e.g. Cu foam) and 1-5 wet anode layers in an alternating sequence to form an anode stack, which was followed by compressing the anode stack to form the anode electrode. This anode electrode was then attached to a porous separator layer. Separately, we assembled typically 1-5 conductive porous layers (e.g. Al or graphite foam) and 1-5 wet cathode layers in an alternating sequence to form a cathode stack, which was followed by compressing the cathode stack to form the cathode electrode. This cathode electrode was then brought to be stacked against the porous separator layer to form a consolidated cell.

Alternatively, we prepared an anode stack, a separator, and a cathode stack. The entire assembly was then compressed or compacted to form an assembly of a compressed/compacted anode electrode, a porous separator layer, and a compressed/compacted cathode layer. The resulting cell was then housed and sealed in a pouch to form a cell.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation.

EXAMPLE 20

Representative Testing Results

Figure 5:
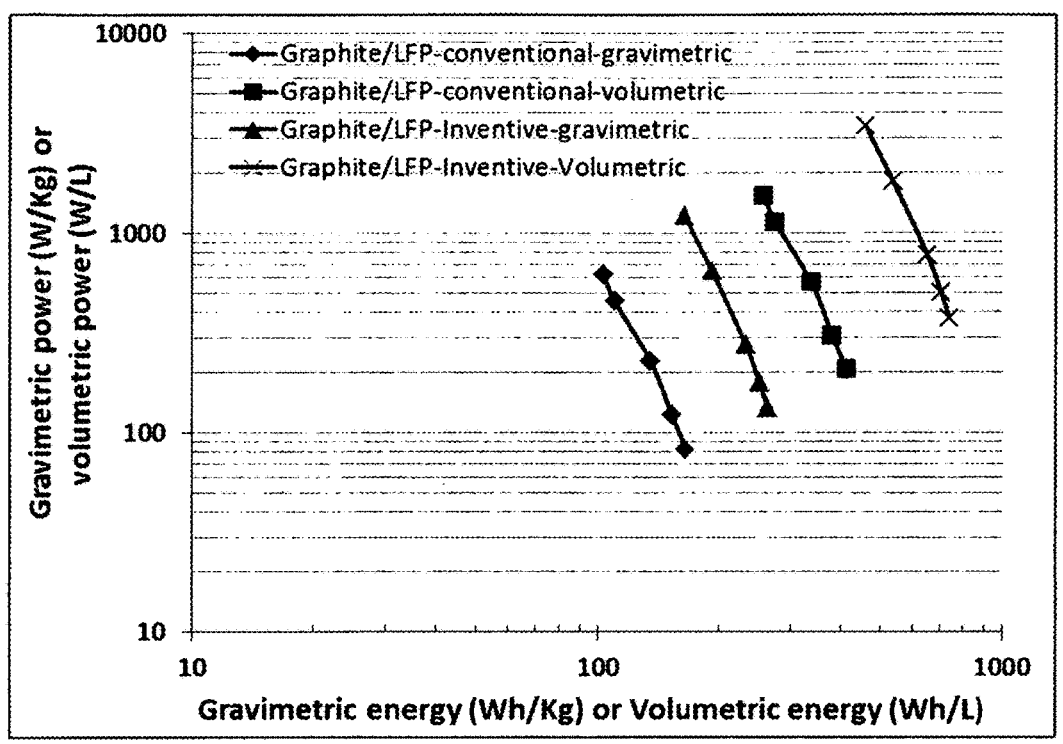
FIG. 5 Ragone plots (gravimetric and volumetric power density vs. energy density) of lithium-ion battery cells containing graphite particles as the anode active material and carbon-coated LFP particles as the cathode active materials. Two of the 4 data curves are for the cells prepared according to an embodiment of instant invention and the other two by the conventional slurry coating of electrodes (roll-coating).

For each sample, several current densities (representing charge/discharge rates) were imposed to determine the electrochemical responses, allowing for calculations of energy density and power density values required of the construction of a Ragone plot (power density vs. energy density). Shown in FIG. 5 are Ragone plots (gravimetric and volumetric power density vs. energy density) of lithium-ion battery cells containing graphite particles as the anode active material and carbon-coated LFP particles as the cathode active materials. Two of the 4 data curves are for the cells prepared according to an embodiment of instant invention and the other two by the conventional slurry coating of electrodes (roll-coating). Several significant observations can be made from these data:

Both the gravimetric and volumetric energy densities and power densities of the lithium-ion battery cells prepared by the presently invented method (denoted as "inventive" in the figure legend) are significantly higher than those of their counterparts prepared via the conventional roll-coating method (denoted as "conventional"). A change from an anode thickness of 160 μm (coated on a flat solid Cu foil) to a thickness of 215 μm (all accommodated in pores of a Ni foam having 85% porosity) and a corresponding change in the cathode to maintain a balanced capacity ratio results in a gravimetric energy density increase from 165 Wh/kg to 264 Wh/kg. Even more surprisingly, the volumetric energy density is increased from 412.5 Wh/L to 739 Wh/L. This latter value of 739 Wh/L has never been previously achieved with a lithium-ion battery using a graphite anode and a lithium iron phosphate cathode.

These huge differences cannot be simply ascribed to the increases in the electrode thickness and the mass loading. The differences are likely due to the significantly higher active material mass loading (not just mass loading) associated with the presently invented cells, reduced proportion of overhead (non-active) components relative to the active material weight/volume, no need to have a binder resin, surprisingly better utilization of the electrode active material (most, if not all, of the graphite particles and LFP particles contributing to the lithium ion storage capacity; no dry pockets or ineffective spots in the electrode, particularly under high charge/discharge rate conditions), and the surprising ability of the inventive method to more effectively pack active material particles in the pores of the foamed current collector.

Figure 6:
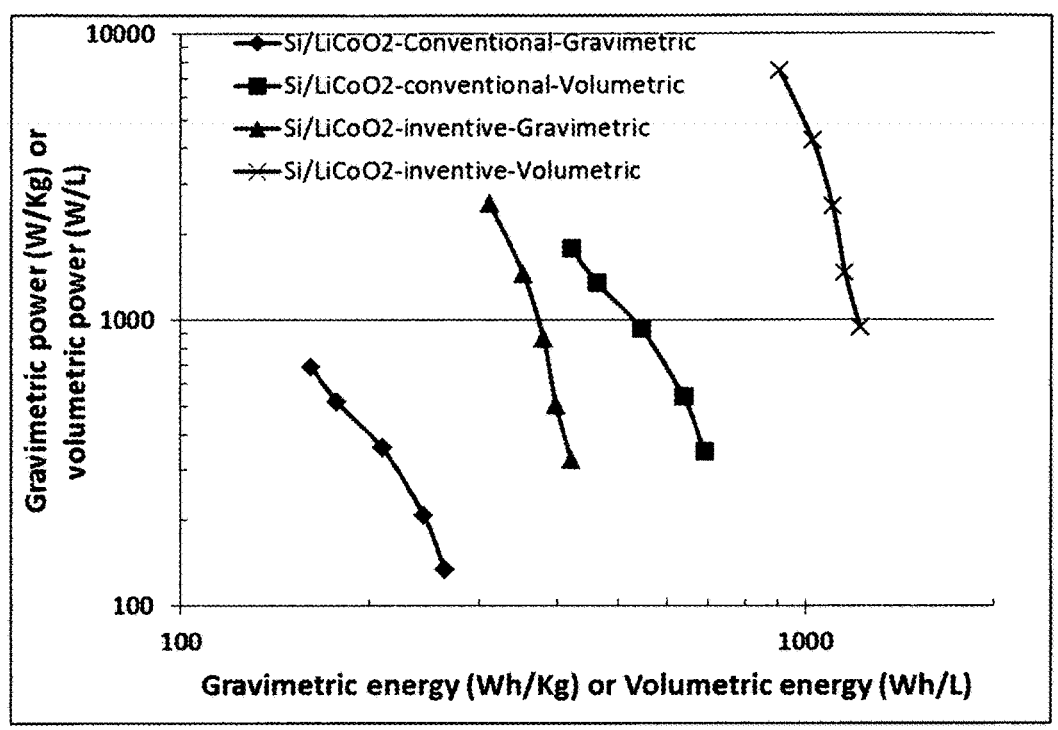
FIG. 6 Ragone plots (both gravimetric and volumetric power density vs. gravimetric and volumetric energy density) of two cells, both containing graphene-embraced Si nano particles as the anode active material and LiCoO$_2$ nano particles as the cathode active material. The experimental data were obtained from the Li-ion battery cells that were prepared by the presently invented method and those by the conventional slurry coating of electrodes.

FIG. 6 shows the Ragone plots (both gravimetric and volumetric power density vs. gravimetric and volumetric energy density) of two cells, both containing graphene-embraced Si nano particles as the anode active material and LiCoO$_2$ nano particles as the cathode active material. The experimental data were obtained from the Li-ion battery cells that were prepared by the presently invented method and those by the conventional slurry coating of electrodes.

These data indicate that both the gravimetric and volumetric energy densities and power densities of the battery cells prepared by the presently invented method are significantly higher than those of their counterparts prepared via the conventional method. Again, the differences are huge. The conventionally made cells exhibit a gravimetric energy density of 265 Wh/kg and volumetric energy density of 689 Wh/L, but the presently invented cells deliver 421 Wh/kg and 1,220.9 Wh/L, respectively. The cell-level energy density of 1,220.9 Wh/L has never been previously achieved with any rechargeable lithium battery. The power densities as high as 2565 W/kg and 7,438 W/L are also unprecedented for lithium-ion batteries.

These energy density and power density differences are mainly due to the high active material mass loading (>25 mg/cm² in the anode and >45 mg/cm² in the cathode) associated with the presently invented cells, reduced proportion of overhead (non-active) components relative to the active material weight/volume, no need to have a binder resin, the ability of the inventive method to better utilize the active material particles (all particles being accessible to liquid electrolyte and fast ion and electron kinetics), and to more effectively pack active material particles in the pores of the foamed current collectors.

Figure 7:
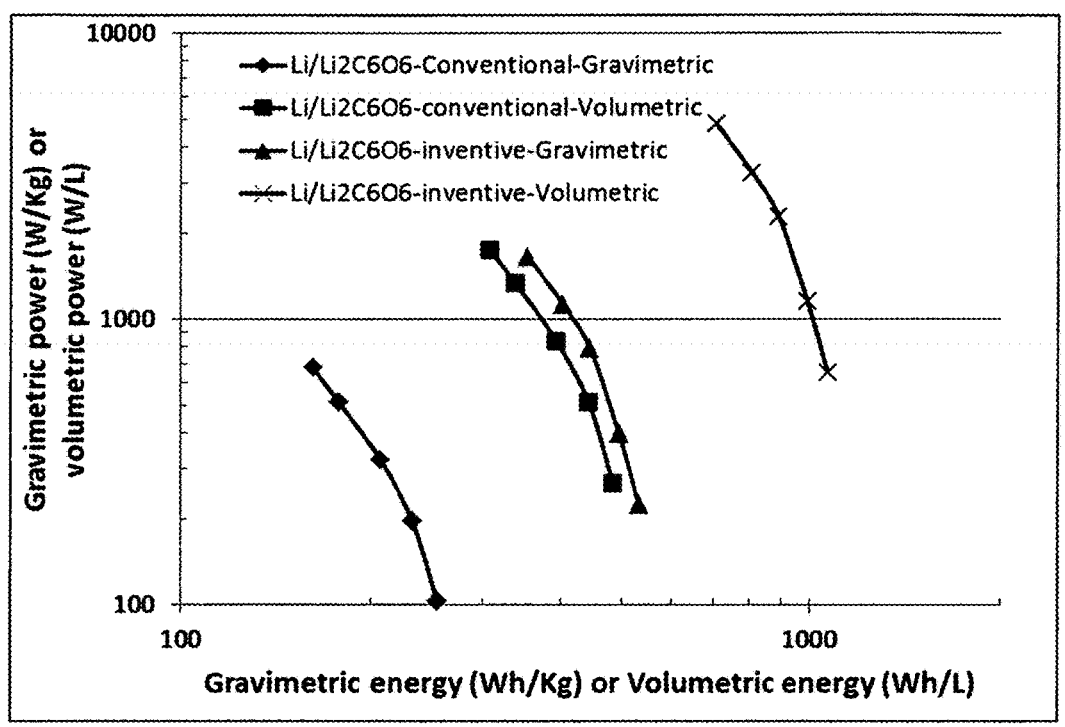
FIG. 7 Ragone plots of lithium metal batteries containing a lithium foil as the anode active material, dilithium rhodizonate (Li$_2$C$_6$O$_6$) as the cathode active material, and lithium salt (LiPF$_6$)-PC/DEC as organic liquid electrolyte. The data are for both lithium metal cells prepared by the presently invented method and those by the conventional slurry coating of electrodes.

Shown in FIG. 7 are Ragone plots of lithium metal batteries containing a lithium foil as the anode active material, dilithium rhodizonate ($Li_2C_6O_6$) as the cathode active material, and lithium salt ($LiPF_6$)-PC/DEC as organic liquid electrolyte. The data are for both lithium metal cells prepared by the presently invented method and those by the conventional slurry coating of electrodes. These data indicate that both the gravimetric and volumetric energy densities and power densities of the lithium metal cells prepared by the presently invented method are significantly higher than those of their counterparts prepared via the conventional method. Again, the differences are huge and are likely due to the significantly higher active material mass loading (not just mass loading) associated with the presently invented cells, reduced proportion of overhead (non-active) components relative to the active material weight/volume, no need to have a binder resin, surprisingly better utilization of the electrode active material (most, if not all, of the active material contributing to the lithium ion storage capacity; no dry pockets or ineffective spots in the electrode, particularly under high charge/discharge rate conditions), and the surprising ability of the inventive method to more effectively pack active material particles in the pores of the foamed current collector.

Quite noteworthy and unexpected is the observation that the gravimetric energy density of the presently invented lithium metal-organic cathode cell is as high as 533 Wh/kg, higher than those of all rechargeable lithium-metal or lithium-ion batteries ever reported (recall that current Li-ion batteries store 150-220 Wh/kg based on the total cell weight). Also quite astonishing is the observation that the volumetric energy density of such an organic cathode-based battery is as high as 1066 Wh/L, an unprecedentedly high value that tops those of all lithium-ion and lithium metal batteries ever reported. Furthermore, for organic cathode active material-based lithium batteries, a gravimetric power density of 1,657 W/kg and maximum volumetric power density of 4,805 W/L would have been un-thinkable.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In a commercial lithium-ion batteries having an electrode thickness of 100-200 μm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

EXAMPLE 21

Achievable Electrode Thickness and its Effect on Electrochemical Performance of Lithium Battery Cells One might be tempted to think the electrode thickness of a lithium battery is a design parameter that can be freely adjusted for optimization of device performance. Contrary to this perception, in reality, the lithium battery electrode thickness is manufacturing-limited and one cannot produce electrodes of good structural integrity that exceed certain thickness level in a real industrial manufacturing environment (e.g. a roll-to-roll coating facility). The conventional battery electrode design is based on coating an electrode layer on a flat metal current collector, which has several major problems: (a) A thick coating on solid Cu foil or Al foil requires a long drying time (requiring a heating zone that is 30-100 meters long). (b) Thick electrodes tend to get delaminated or cracked upon drying and subsequent handling, and even with a resin binder proportion as high as 15-20% to hopefully improve the electrode integrity this problem remains a major limiting factor. Thus, such an industry practice of roll-coating of slurry on a solid flat current collector does not allow for high active material mass loadings. (c) A thick electrode prepared by coating, drying, and compression makes it difficult for electrolyte (injected into a cell after the cell is made) to permeate through the electrode and, as such, a thick electrode would mean many dry pockets or spots that are not wetted by the electrolyte. This would imply a poor utilization of the active materials. The instant invention solves these long-standing, critically important issues associated with lithium batteries.

Figure 8:
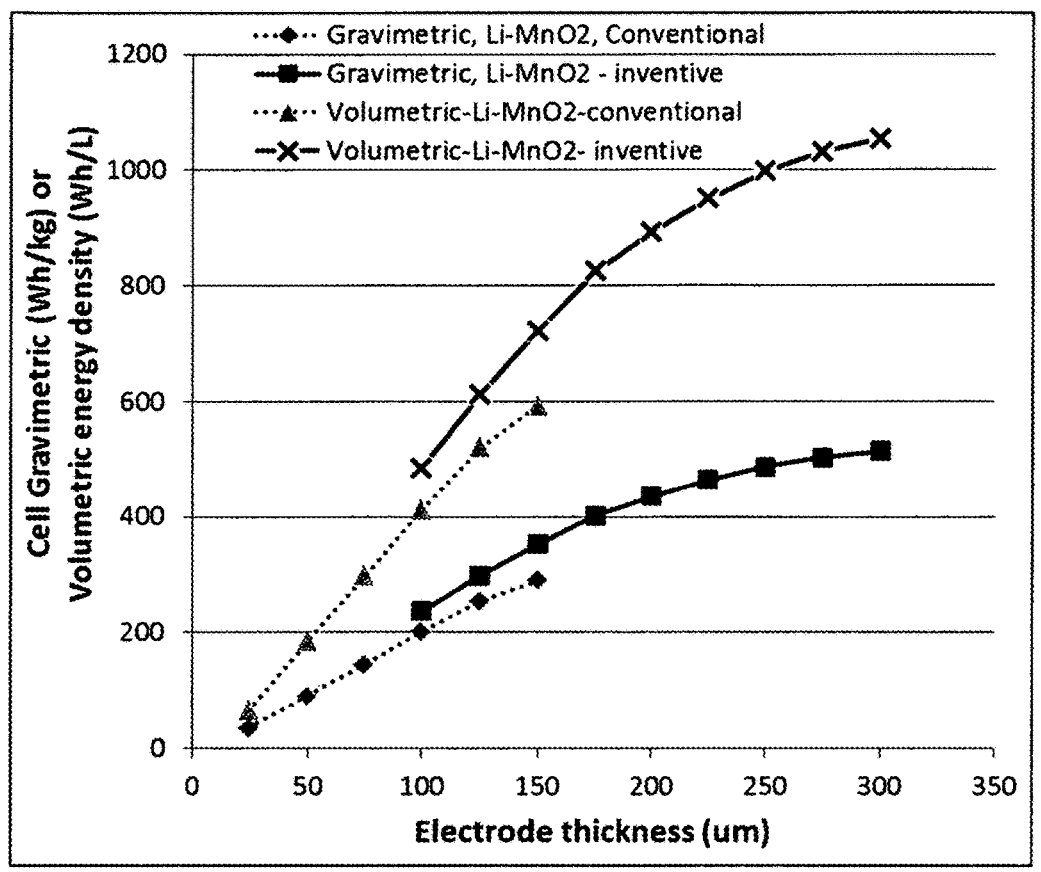
FIG. 8 The cell-level gravimetric (Wh/kg) and volumetric energy densities (Wh/L) of lithium metal cells plotted over the achievable cathode thickness range of the MnO$_2$/RGO cathode prepared via the conventional method without delamination and cracking and those by the presently invented method. In this figure, the data points are labelled as the gravimetric (♦) and volumetric (▲) energy density of the conventional Li-MnO$_2$/RGO batteries and the gravimetric (■) and volumetric (x) energy density of the presently invented ones.

Shown in FIG. 8 are the cell-level gravimetric (Wh/kg) and volumetric energy densities (Wh/L) of lithium metal cells plotted over the achievable cathode thickness range of the $MnO_2$/RGO cathode prepared via the conventional method without delamination and cracking and those by the presently invented method. In this figure, the data points are labelled as the gravimetric (♦) and volumetric (▲) energy density of the conventional Li-$MnO_2$/RGO batteries and the gravimetric (■) and volumetric (x) energy density of the presently invented ones.

The electrodes can be fabricated up to a thickness of 100-200 μm using the conventional slurry coating process. However, in contrast, there is no theoretical limit on the electrode thickness that can be achieved with the presently invented method. Typically, the practical electrode thickness is from 10 μm to 1000 μm, more typically from 100 μm to 800 μm, and most typically from 200 μm to 600 μm.

These data further confirm the surprising effectiveness of the presently invented method in producing ultra-thick lithium battery electrodes not previously achievable. These ultra-thick electrodes in lithium metal batteries lead to exceptionally high cathode active material mass loading, typically significantly >25 mg/$cm^2$ (more typically >30 mg/$cm^2$, further typically >40 mg/$cm^2$, often >50 mg/$cm^2$, and even >60 mg/$cm^2$) for an inorganic cathode active material. These high active material mass loadings have not been possible to obtain with conventional lithium batteries made by the slurry coating processes. These high active material mass loadings led to exceptionally high gravimetric and volumetric energy densities that otherwise have not been previously achieved (e.g. 514 Wh/kg and 1054 Wh/L of the presently invented lithium metal battery) given the same battery system.

EXAMPLE 22

Achievable Active Material Weight Percentage in a Cell and its Effect on Electrochemical Performance of Lithium Battery Cells Because the weight of the anode and cathode active materials combined accounts for up to about 30%-50% of the total mass of the packaged commercial lithium batteries, a factor of 30%-50% must be used to extrapolate the energy or power densities of the device from the performance data of the active materials alone. Thus, the energy density of 500 Wh/kg of combined graphite and NMC (lithium nickel manganese cobalt oxide) weights will translate to about 150-250 Wh/kg of the packaged cell. However, this extrapolation is only valid for electrodes with thicknesses and densities similar to those of commercial electrodes (150 μm or about 15 mg/$cm^2$ of the graphite anode and 30 mg/$cm^2$ of NMC cathode). An electrode of the same active material that is thinner or lighter will mean an even lower energy or power density based on the cell weight. Thus, it would be desirable to produce a lithium-ion battery cell having a high active material proportion. Unfortunately, it has not been previously possible to achieve a total active material proportion greater than 45% by weight in most of the commercial lithium-ion batteries.

The presently invented method enables the lithium batteries to go well beyond these limits for all active materials investigated. As a matter of fact, the instant invention makes it possible to elevate the active material proportion above 90% if so desired; but typically from 45% to 85%, more typically from 40% to 80%, even more typically from 40% to 75%, and most typically from 50% to 70%.

Figure 9:
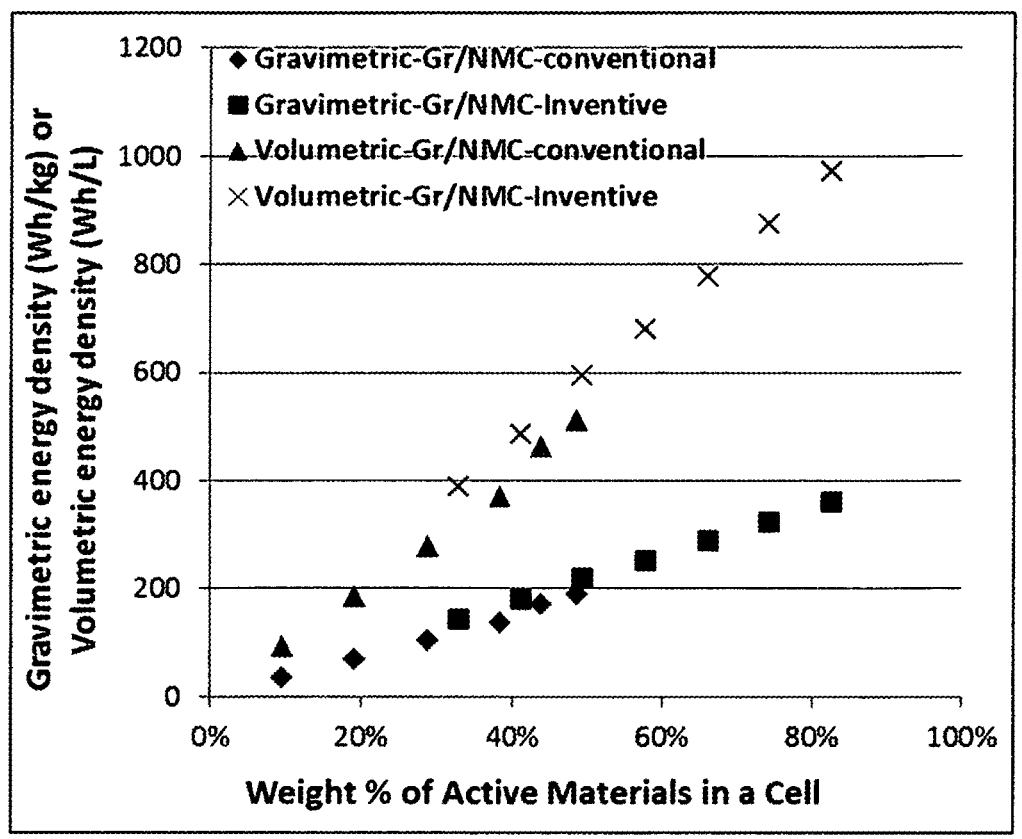
FIG. 9 The cell-level gravimetric and volumetric energy densities of the graphite/NMC cells prepared by the presently invented method and those by the conventional roll-coating method.

Shown in FIG. 9 are the cell-level gravimetric and volumetric energy densities of the graphite/NMC cells prepared by the presently invented method and the conventional roll-coating method. These data further demonstrate the implications of our ability to take the total active material mass beyond 50%, enabling the attainment of unexpectedly high gravimetric and volumetric energy densities that have not been previously possible given the same lithium battery system (e.g. elevated from 190 Wh/kg to 360 Wh/kg and from 510 Wh/L to 970 Wh/L).

We claim:

1. A process for producing a lithium battery, said process comprising:
    (A) preparing a plurality of electrically conductive porous layers, a plurality of gel-like or semi-rigid wet anode layers of an anode active material and an optional conductive additive mixed with a first liquid electrolyte, and a plurality of gel-like or semi-rigid wet cathode layers of a cathode active material and an optional conductive additive mixed with a second liquid electrolyte, wherein said conductive porous layers contain interconnected conductive pathways and at least 80% by volume of pores;
    (B) stacking and consolidating a desired number of said porous layers and a desired number of said wet anode layers in an alternating manner to form an anode electrode having a thickness no less than 100 μm;
    (C) placing porous separator layer in contact with said anode electrode;
    (D) stacking and consolidating a desired number of said porous layers and a desired number of said wet cathode layers in an alternating manner to form a cathode electrode in contact with said porous separator, wherein said cathode electrode has a thickness no less than 100 μm; wherein said step (D) is conducted before or after step (B); and
    (E) assembling and sealing said anode electrode, porous separator, and cathode electrode in a housing to produce said lithium battery;
    wherein said process requires no injection of electrolyte after assembling said anode electrode, porous separator, and cathode electrode, said anode active material has a material mass loading no less than 20 mg/$cm^2$ in said anode electrode and/or said cathode active material has a material mass loading no less than 15 mg/$cm^2$ for an organic or polymer material or no less than 30 mg/$cm^2$ for an inorganic and non-polymer material in said cathode electrode.

2. The process of claim 1, wherein said lithium battery is a lithium-ion battery and said anode active material is selected from the group consisting of: silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), cadmium (Cd), prelithiated versions thereof, and combinations thereof.

3. The process of claim 1, wherein said cathode active material contains a lithium intercalation compound selected from the group consisting of lithium cobalt oxide, doped lithium cobalt oxide, lithium nickel oxide, doped lithium nickel oxide, lithium manganese oxide, doped lithium manganese oxide, lithium vanadium oxide, doped lithium vanadium oxide, lithium mixed-metal oxides, lithium iron phosphate, lithium vanadium phosphate, lithium manganese phosphate, lithium mixed-metal phosphates, metal sulfides, and combinations thereof.

4. The process of claim 1, wherein said first liquid electrolyte and/or said second liquid electrolyte contains a lithium salt and a polymer dissolved in a liquid solvent to form a polymer gel electrolyte, wherein said liquid solvent is water, an organic solvent, an ionic liquid, or a mixture of an organic solvent and an ionic liquid.

5. The process of claim 1, wherein said first liquid electrolyte and/or said second liquid electrolyte contains a lithium salt dissolved in a liquid solvent at a concentration no less than 2 M, wherein said liquid solvent is water, an organic solvent, an ionic liquid, or a mixture of an organic solvent and an ionic liquid.

6. The process of claim 1, wherein said first liquid electrolyte and/or said second liquid electrolyte contains a lithium salt dissolved in a liquid solvent at a concentration greater than 3.5 M, wherein said liquid solvent is water, an organic solvent, an ionic liquid, or a mixture of an organic solvent and an ionic liquid.

7. The process of claim 1, wherein said first liquid electrolyte and/or said second liquid electrolyte contains a lithium salt dissolved in a liquid solvent at a concentration greater than 5.0 M, wherein said liquid solvent is water, an organic solvent, an ionic liquid, or a mixture of an organic solvent and an ionic liquid.

8. The process of claim 1, wherein said electrically conductive porous layers have at least 85% by volume of pores, said anode electrode and/or said cathode electrode has a thickness no less than 200 µm, said anode active material has a mass loading no less than 25 mg/cm$^2$ and/or occupies at least 25% by weight or by volume of the entire battery cell, and/or the cathode active material has a mass loading no less than 20 mg/cm$^2$ for an organic or polymer material or no less than 40 mg/cm$^2$ for an inorganic and non-polymer material in said cathode and/or occupies at least 40% by weight or by volume of the entire battery cell.

9. The process of claim 1, wherein said electrically conductive porous layers have at least 90% by volume of pores, said anode electrode and/or said cathode electrode has a thickness no less than 300 µm, and/or said anode active material has a mass loading no less than 30 mg/cm$^2$ and/or occupies at least 30% by weight or by volume of the entire battery cell, and/or the cathode active material has a mass loading no less than 25mg/cm$^2$ for an organic or polymer material or no less than 50 mg/cm$^2$ for an inorganic and non-polymer material in said cathode and/or occupies at least 50% by weight or by volume of the entire battery cell.

10. The process of claim 1, wherein said electrically conductive porous layers have at least 95% by volume of pores, said anode electrode and/or said cathode electrode has a thickness no less than 400 µm, and/or said anode active material has a mass loading no less than 35 mg/cm$^2$ and/or occupies at least 35% by weight or by volume of the entire battery cell, and/or the cathode active material has a mass loading no less than 30 mg/cm$^2$ for an organic or polymer material or no less than 55 mg/cm$^2$ for an inorganic and non-polymer material in said cathode and/or occupies at least 55% by weight or by volume of the entire battery cell.

11. The process of claim 1, wherein said electrically conductive porous layers are selected from metal foam, metal web or screen, perforated metal sheet-based structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

12. The process of claim 2, wherein said prelithiated graphene sheets are selected from prelithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

13. The process of claim 1, wherein said cathode active material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

14. A process for producing a lithium battery, said process comprising:
(A) preparing a plurality of electrically conductive porous layers, a plurality of wet anode layers of an anode active material and an optional conductive additive mixed with a first liquid electrolyte, and a plurality of wet cathode layers of a cathode active material and an optional conductive additive mixed with a second liquid electrolyte, wherein said conductive porous layers contain interconnected conductive pathways and at least 80% by volume of pores;
(B) stacking a desired number of said porous layers and a desired number of said wet anode layers in an alternating manner;
(C) consolidating said porous layers and said wet anode layers, and impregnating said pores of said porous layer with said anode active material, said optional conductive additive, and said first liquid electrolyte to form an anode electrode having a thickness no less than 100 µm;
(D) placing porous separator layer in contact with said anode electrode;
(E) stacking a desired number of said porous layers and a desired number of said wet cathode layers in an alternating manner;
(F) consolidating said porous layers and said wet cathode layers, and impregnating said pores of said porous layer with said cathode active material, said optional conductive additive, and said second liquid electrolyte to form an cathode electrode in contact with said porous separator, wherein said cathode electrode has a thickness no less than 100 µm, wherein said step (E) and step (F) are conducted before or after step (B) and step (C); and
(G) assembling and sealing said anode electrode, porous separator, and cathode electrode in a housing to produce said lithium battery;
wherein said process requires no injection of electrolyte after assembling said anode electrode, porous separator, and cathode electrode, said anode active material has a material mass loading no less than 20 mg/cm$^2$ in said anode electrode and/or said cathode active material has a material mass loading no less than 15 mg/cm$^2$ for an organic or polymer material or no less than 30 mg/cm$^2$ for an inorganic and non-polymer material in said cathode electrode.

* * * * *